United States Patent
Kyan

(10) Patent No.: US 12,489,946 B2
(45) Date of Patent: Dec. 2, 2025

(54) ONLINE SHOW RENDITION SYSTEM, LAUGHTER ANALYSIS DEVICE, AND LAUGHTER ANALYSIS METHOD

(71) Applicant: LOLLOL CO., LTD., Okinawa (JP)

(72) Inventor: Hiroyuki Kyan, Okinawa (JP)

(73) Assignee: LOLLOL CO., LTD., Okinawa (JP)

( * ) Notice: Subject to any disclaimer, the term of this patent is extended or adjusted under 35 U.S.C. 154(b) by 415 days.

(21) Appl. No.: 18/018,131

(22) PCT Filed: Jul. 28, 2021

(86) PCT No.: PCT/JP2021/027893
§ 371 (c)(1),
(2) Date: Jan. 26, 2023

(87) PCT Pub. No.: WO2022/025113
PCT Pub. Date: Feb. 3, 2022

(65) Prior Publication Data
US 2023/0199251 A1    Jun. 22, 2023

(30) Foreign Application Priority Data

Jul. 29, 2020   (JP) .................................. 2020-127869

(51) Int. Cl.
| H04N 21/442 | (2011.01) |
| G06V 40/16 | (2022.01) |
| G10L 25/63 | (2013.01) |

(52) U.S. Cl.
CPC ..... H04N 21/44218 (2013.01); G06V 40/174 (2022.01); G10L 25/63 (2013.01)

(58) Field of Classification Search
None
See application file for complete search history.

(56) References Cited

U.S. PATENT DOCUMENTS

| 2006/0092292 A1 | 5/2006 | Matsuoka et al. |
| 2010/0049278 A1 | 2/2010 | Kuramori |

(Continued)

FOREIGN PATENT DOCUMENTS

| JP | 2006-115406 A | 4/2006 |
| JP | 2008-125599 A | 6/2008 |

(Continued)

OTHER PUBLICATIONS

English language translation of international written opinion (Year: 2021).*

(Continued)

Primary Examiner — Michelle M Entezari Hausmann
(74) Attorney, Agent, or Firm — GREENBLUM & BERNSTEIN, P.L.C.

(57) ABSTRACT

A management terminal device, on the basis of a first emotion analysis value, a second emotion analysis value, a third emotion analysis value, and a user attribute analysis value which are numerical values representing users' emotions, calculates a comprehensive user's emotion analysis value for each user, and, on the basis of a plurality of comprehensive user's emotion analysis values of at least some of the users, generates image information and audio information. When a user terminal device outputs online-delivered information, the management terminal device causes an image output unit and an audio output unit of the user terminal device to output the information with the image information and the audio information superimposed thereon.

22 Claims, 11 Drawing Sheets

(56) References Cited

U.S. PATENT DOCUMENTS

| | | |
|---|---|---|
| 2010/0296706 A1 | 11/2010 | Kaneda et al. |
| 2011/0201971 A1 | 8/2011 | Kimura |
| 2016/0142767 A1 | 5/2016 | Shigeta et al. |
| 2018/0303397 A1* | 10/2018 | Krupat .................. G16H 50/20 |

FOREIGN PATENT DOCUMENTS

| | | |
|---|---|---|
| JP | 2009-195346 A | 9/2009 |
| JP | 2010-271872 A | 12/2010 |
| JP | 2014-119879 A | 6/2014 |
| JP | 2018-22118 A | 2/2018 |
| WO | WO 2014/192457 A1 | 12/2014 |

OTHER PUBLICATIONS

Schmidt, Karen L., et al. "Movement differences between deliberate and spontaneous facial expressions: Zygomaticus major action in smiling." Journal of nonverbal behavior 30 (2006): 37-52. (Year: 2006).*

Kuramoto, Eriko, et al. "Characteristics of facial muscle activity during voluntary facial expressions: Imaging analysis of facial expressions based on myogenic potential data." Neuropsychopharmacology reports 39.3 (2019): 183-193. (Year: 2019).*

Wibowo, Hardianto, et al. "Facial expression recognition of 3D image using facial action coding system (FACS)." Telkomnika (Telecommunication Computing Electronics and Control) 17.2 (2019): 628-636. (Year: 2019).*

Clark, Elizabeth A., et al. "The facial action coding system for characterization of human affective response to consumer product-based stimuli: a systematic review." Frontiers in psychology 11 (2020): 920. (Year: 2020).*

Yang, Bin, and Peifa Jia. "A facial expression model for human-like agent." 2006 IEEE Conference on Robotics, Automation and Mechatronics. IEEE, 2006. (Year: 2006).*

Correia-Caeiro, C., Costa, R., Hayashi, M., Burrows, A., Pater, J., Miyabe-Nishiwaki, T., Richardson, J.L., Robbins, M.M., Waller, B. and Liebal, K., 2025. GorillaFACS: The Facial Action Coding System for the Gorilla spp. PloS one, 20(1), p.e0308790. (Year: 2025).*

Mapelli, A. N. D. R. E. A. "Temporomandibular joint in health and disease: a 3d morphofunctional analysis." (2012). (Year: 2012).*

Lien, James Jenn-Jier, et al. "Detection, tracking, and classification of action units in facial expression." Robotics and Autonomous Systems 31.3 (2000): 131-146. (Year: 2000).*

Linstrom, Christopher J. "Objective facial motion analysis in patients with facial nerve dysfunction." The Laryngoscope 112.7 (2002): 1129-1147. (Year: 2002).*

Kim KE, Oh SH, Lee SU, Chung SG. Application of isometric load on a facial muscle—The zygomaticus major. Clinical Biomechanics. Oct. 1, 2009;24(8):606-12. (Year: 2009).*

Nascimben, Mauro, and Thomas Zoëga Ramsøy. "A minimal setup for spontaneous smile quantification applicable for valence detection." Frontiers in psychology 11 (2020): 566354. (Year: 2020).*

ISR for PCT/JP2021/027893, dated Oct. 12, 2021.

* cited by examiner

ONLINE SHOW RENDITION SYSTEM, LAUGHTER ANALYSIS DEVICE, AND LAUGHTER ANALYSIS METHOD

TECHNICAL FIELD

The present invention relates to an online show rendition system that automatically applies a rendition to online-delivered information in online delivery of shows, and a laughter analysis device and a laughter analysis method for calculating an emotion analysis value relating to laughter of a subject such as a user.

BACKGROUND ART

In shows such as comedy stages and stages, the audience views comic dialogues of comedians and performers, or programs such as skits, plays, expressions, and Ogiri (question-with-comical-improvised-answer session) projects, and expresses laughter or reactions/emotions each time. An entertainer such as a comedian or a performer adjusts an interval between joke materials or a point to raise a laugh or inserts an ad-lib in response to audience's reactions, thereby constructing (rendering) further laughter.

Further, in variety programs of television, etc., laughter of program staffs thereof or live laughter of studio spectators is intentionally inserted, or laughter sounds or reaction sounds are inserted under editing. As a result, the programs are devised (rendered) to convey points to raise a laugh or funny points to viewers in an easy-to-understand manner and liven up the programs.

A quantitative fun evaluation device for quantitatively evaluating the fun in an oral presentation is known as a system for supporting a rendition as described above (for example, see Patent Literature 1). The quantitative fun evaluation device comprises an evaluation unit for evaluating the fun of a program performed by a performer based on a first analysis result and a second analysis result. The first analysis result indicates the tendency of a speaking style of the performer derived based on the voices uttered by the performer during the program. The second analysis result indicates the tendency of a content performed by the performer derived based on the laughter of persons who view the program.

Further, in order to effectively support the rendition of shows, etc., it is simultaneously required to quantitatively and accurately measure the state of laughter of a subject including a user (such as a person watching a program), including the above-mentioned quantitative fun evaluation device. If it is impossible to accurately analyze the laughter of the subject, it is also impossible to evaluate whether the rendition is appropriate. By analyzing emotions related to laughter quantitatively and accurately, adaptive support is provided according to the progress condition of the show based on an analysis result, which may lead to a more realistic rendition as a result.

As a device for quantitatively evaluating human laughter, there is known a laughter measuring device for detecting human laughter by measuring chronological changes in the surface potential of a skin in the vicinity of the human xiphoid process or in the vicinity of a site above the 7th rib (costa) located at about 10 cm from the xiphoid process to the right approximately horizontally (for example, see Patent Literature 2). This type of laughter measuring device calculates chronological changes in the intensity of respective frequencies of measured potential measurement waves, and maps the calculated data with one axis set as a frequency axis and the other axis set as a time axis such that the chronological changes in the intensity of the respective frequencies can be identified with color or the like. Thereafter, the laughter measuring device compares it with a laughter reference pattern prepared in advance to detect laughter of an examinee. As a result, it is possible to accurately detect laughter that is difficult to appear on the surface, such as "holding back laughter".

CITATION LIST

Patent Literature

Patent Literature 1: Japanese Unexamined Patent Application Publication No. 2018-22118
Patent Literature 1: Japanese Unexamined Patent Application Publication No. 2009-195346

SUMMARY OF INVENTION

Technical Problem

In recent years, online delivery has begun to spread socially, and trials of online delivery or its application are also being made in the field of shows such as comedy stages or stages.

However, when a comedian or performer presents a program through normal online delivery, he/she cannot watch or hear the laughter or reactions of the audience (viewers, subjects) (has no feedback). Therefore, it is difficult for the comedian or performer to make an adjustment that is unique to a live theater or stage (show) or to make an ad-lib or a development in response to the audience's reaction.

Further, it is also difficult for viewers to grasp the laughter or reactions of other viewers when individually viewing in front of the screen of an information terminal such as a personal computer or a smartphone. Therefore, there is a situation that it is difficult to enjoy a sense of reality unique to comedies or stages without sharing laughter or laughing voices, sympathizing and inviting laughter with other viewers, which occur in live viewing at theaters or stages.

Furthermore, with respect to insertion of laughter of program staffs in variety programs of television and the like, raw laughter of studio spectators, or the laughter under edition, there may occur a gap (gap in consciousness) between a point to raise laughter of the spectators and that of a program producer, and the insertion of laughter may not represent the audience's laughter. Further, although the system of Patent Literature 1 is capable of quantitatively evaluating the fun of an oral presentation, it can be said that there is room for improvement in terms of the feedback.

Further, the laughter measuring device of Patent Literature 2 can detect and quantify only original "funny" laughter excluding "feigned laughter" or "fake smile," and can also accurately detect laughter that is difficult to appear on the surface.

However, it can be said that this laughter measuring device has room for improvement in detection accuracy for other types of laughter such as gradual laughter and momentary laughter (burst laughter).

Further, this laughter measuring device analyzes laughter by measuring the skin surface potential of the surface of bone tissue. Therefore, it is configured to have a potential measuring unit, and the potential measuring unit is always attached to the skin surface of a human who is an examinee (subject) during analysis. For this reason, people may not be able to concentrate on laughter at a show or the like because they are concerned about the existence of contact objects on the skin surfaces thereof. In addition, it is necessary to attach the potential measuring unit each time the measurement is performed, the measurement work is complicated, and the measurement may be difficult especially when a large number of persons are measurement targets. It can be said that the laughter measuring device of Patent Literature 2 has room for improvement also in terms of ease of handling.

The present invention has been made in view of the circumstances described above, and has a first object to provide an online show rendition system which tallies and numerically expresses viewers' realistic expressions, feelings, and reactions in online delivery of shows such as stages and programs, and inserting appropriately measured and timed laughter and reactions into the online delivery based on numerical values thereof, whereby it is possible to enhance the share of audience's emotions and a sense of reality to be felt by audience.

In relation to this first object, the present invention has a second object to provide a laughter analysis device and a laughter analysis method that are capable of quantitatively and accurately analyzing laughter-related expressions or emotions of people (users such as viewers), and simplifying handling in the analysis to enhance the efficiency of an analysis work.

Solution to Problem (1) An online show rendition system comprising:
a management terminal device for delivering a show online; and
a plurality of user terminal devices, each comprising an image output unit, an audio output unit, an imaging unit, and a sound recording unit, being configured to be capable of mutually communicating information with the management terminal device, and outputting information delivered online by the management terminal device to the image output unit and the audio output unit to allow a user to view the show,
wherein at least one of the user terminal device and the management terminal device being configured to:
analyze an emotion of the user based on a motion of a facial expression of the user imaged by the imaging unit of the user terminal device to calculate a first emotion analysis value;
analyze a motion of the user based on a motion of a body of the user imaged by the imaging unit of the user terminal device to calculate a second emotion analysis value;
analyze a reaction of the user based on type and/or volume of an utterance of the user recorded by the sound recording unit of the user terminal device to calculate a third emotion analysis value;
analyze an attribute of the user based on user information and terminal information acquired through the user terminal device to calculate a user attribute analysis value;
calculate a comprehensive user's emotion analysis value based on the first emotion analysis value, the second emotion analysis value, the third emotion analysis value and the user attribute analysis value for each of the users;
generate image information and/or audio information based on a plurality of the comprehensive user's emotion analysis values in at least some of all the users; and
cause the image output unit and/or the audio output unit of the user terminal device to output online-delivered information with the image information and/or the audio information superimposed on the online-delivered information when the user terminal device outputs the online-delivered information.

(2) The online show rendition system according to (1), further comprising a database in which at least one of location information, volume information, number-of-seats information, space information and expected number-of-spectators information of a real or virtual venue where the show is held is stored,
wherein at least one of the user terminal device and the management terminal device is further configured to generate the image information and/or the audio information also by referring to the database when generating the image information and/or the audio information.

(3) The online show rendition system according to (1) or (2), wherein the image information is at least one of telop information and numerical value information based on the comprehensive user's emotion analysis value.

(4) A laughter analysis device configured to:
acquire at least a first facial surface position corresponding to a root portion, on an eye side of a subject, of a zygomaticus major muscle of the subject, and a plurality of second facial surface positions corresponding to portions other than the root portion of the zygomaticus major muscle on at least one of left and right sides of a face of the subject;
after setting the first facial surface position as a reference position and setting each of the second facial surface positions as a first reference position, calculate each of displacements between the first reference positions and the reference position in a predetermined time cycle, and sum up the calculated displacements for every predetermined time cycle to calculate a first feature quantity; and
calculate a laughter-related emotion analysis value of the subject based on the first feature quantity.

(5) The laughter analysis device according to (4), configured to:
further acquire a plurality of third facial surface positions corresponding to cheekbone fat of the subject on at least one of the left and right sides of the face of the subject;
after setting each of the plurality of third facial surface positions as a second reference position, calculate a second feature quantity based on a degree of aggregation at a position group configured of the second reference positions in a predetermined time cycle; and
calculate the emotion analysis value based on the first feature quantity and the second feature quantity.

(6) The laughter analysis device according to (5), wherein the degree of aggregation is calculated by setting a plurality of pairs at the position group, calculating respective displacements between the pairs, and summing up the thus-calculated respective displacements for every predetermined time cycle.

(7) The laughter analysis device according to (5) or (6), configured to:
in a predetermined time cycle, sum up respectively at least the first feature quantity and the second feature quantity after the first feature quantity and the second feature quantity are respectively multiplied by predetermined weighting factors which are individually set for the first feature quantity and the second quantity respectively, thereby calculating a comprehensive feature quantity;

calculate unit laughter energy indicating an energy amount related to laughter per unit time cycle in a predetermined time cycle according to a predetermined dynamic model based on a difference between the comprehensive feature quantity in the predetermined time cycle and the comprehensive feature quantity in a time cycle being one before the predetermined time cycle;

accumulatively add the unit laughter energy every for predetermined time cycle to calculate a total laughter energy up to the predetermined time cycle; and calculate the emotion analysis value based on the total laughter energy.

(8) The laughter analysis device according to (7), configured to:

determine relation in magnitude between the comprehensive feature quantity calculated for every predetermined time cycle and a first threshold value for every predetermined time cycle, and count a number of consecutive times at which the same determination indicating "larger" or "smaller" has continued until the predetermined time cycle since a previous predetermined time cycle; and attenuate and calculate the unit laughter energy in accordance with the number of consecutive times.

(9) The laughter analysis device according to (7) or (8), configured to:

determine, for every predetermined time cycle, whether the unit laughter energy calculated for every predetermined time cycle is larger than a second threshold value;

when it is determined that the unit laughter energy is larger than the second threshold value, add the unit laughter energy in the predetermined time cycle to the total laughter energy calculated in a time cycle being one before the predetermined time cycle to calculate the total laughter energy in the predetermined time cycle; and when it is determined that the unit laugh energy is not larger than the second threshold value, attenuate the total laughter energy calculated in a time cycle being one before the predetermined time cycle, to calculate to be set as the total laughter energy up to the predetermined time cycle.

(10) A laughter analysis method comprising:

acquiring at least a first facial surface position corresponding to a root portion, on an eye side of a subject, of a zygomaticus major muscle of the subject, and a plurality of second facial surface positions corresponding to portions other than the root portion of the zygomaticus major muscle on a facial surface of the subject;

after setting the first facial surface position as a reference position and setting each of the second facial surface positions as a first reference position, calculating each of displacements between the first reference positions and the reference position in a predetermined time cycle, and summing up the calculated displacements for every predetermined time cycle to calculate a first feature quantity; and calculating a laughter-related emotion analysis value of the subject based on the first feature quantity.

According to the above-described configuration (1), tallies and numerically expresses viewers' realistic expressions, feelings, and reactions in online delivery of shows such as stages and programs, and inserting appropriately measured and timed laughter and reactions into the online delivery based on numerical values thereof, whereby it is possible to share laughter or reactions/emotions with other viewers and enhance a sense of reality.

According to the above-described configuration (2), in consideration of information on a real or virtual venue where a show is held, and generates image information and/or audio information to be fed back to the venue of the show, so that the sense of reality can be further enhanced.

According to the above-described configuration (3), the screen information is at least one of telop information and numerical value information based on the comprehensive user's emotion analysis value, so that laughter or reactions/emotions can be easily shared with other viewers.

According to the above-described configuration (4), laughter-related emotions of a user is analyzed based on a first facial surface position corresponding to a root portion, on an eye side of a subject, of the zygomaticus major muscle of the subject (a viewer such as a user) and a plurality of second facial surface positions corresponding to portions other than the root portion of the zygomaticus major muscle on at least one of the left and right sides of the face of the subject. As a result, it is possible to quantitatively and accurately analyze laughter-related expressions or emotions of people (users such as viewers), and enhance the efficiency of an analysis work by simplifying the handling in the analysis.

According to the above-described configuration (5), a plurality of third facial surface positions corresponding to the user's cheekbone fat on at least one of the left and right sides of the user's face are further acquired to analyze the laughter-related emotion. As a result, a human's laughter-related expressions and emotions can be analyzed with higher accuracy.

According to the above-described configuration (6), the degree of aggregation can be calculated more easily.

According to the above-described configuration (7), analysis is performed according to a predetermined dynamic model based on the difference between the comprehensive feature quantity in a predetermined time cycle and the comprehensive feature quantity in the previous time cycle with respect to the predetermined time cycle. As a result, a human's laughter-related expressions and emotions can be analyzed more surely and accurately.

According to the above-described configuration (8), by detecting a state in which transition of laughter is temporally long, such as gradual laughter of a subject (a user such as a viewer), the energy attenuation related to laughter and the attenuation phenomenon of emotions in the same level laughter state are adaptively and quantitatively expressed, whereby it is possible to more accurately analyze the user's laughter-related emotions.

According to the above-described configuration (9), it is possible to adaptively and quantitatively express the emotion attenuation in the laughter-related emotion, and analyze the user's laughter-related emotion with higher accuracy.

According to the above-described configuration (10), it is possible to quantitatively and accurately analyze laughter-related expressions or emotions of people (users such as viewers), and enhance the efficiency of an analysis work by simplifying the handling in the analysis.

Advantageous Effects of Invention

According to the present invention, there is provided an online show rendition system that tallies and numerically expresses viewers' realistic expressions, feelings, and reactions in online delivery of shows such as stages and programs, and inserting appropriately measured and timed laughter and reactions into the online delivery based on numerical values thereof, whereby it is possible to share laughter or reactions/emotions with other viewers and enhance a sense of reality.

Further, according to the present invention, there is provided a laughter analysis device and a laughter analysis method that are capable of quantitatively and accurately analyzing laughter-related expressions or emotions of people (users such as viewers), and simplifying handling in the analysis to enhance the efficiency of an analysis work.

The present invention has been briefly described above. Furthermore, the details of the present invention will be further clarified by reading the following detailed description of modes for carrying out the invention (hereinafter referred to as "embodiments") with reference to the accompanying drawings.

DESCRIPTION OF EMBODIMENTS

Figure 1:
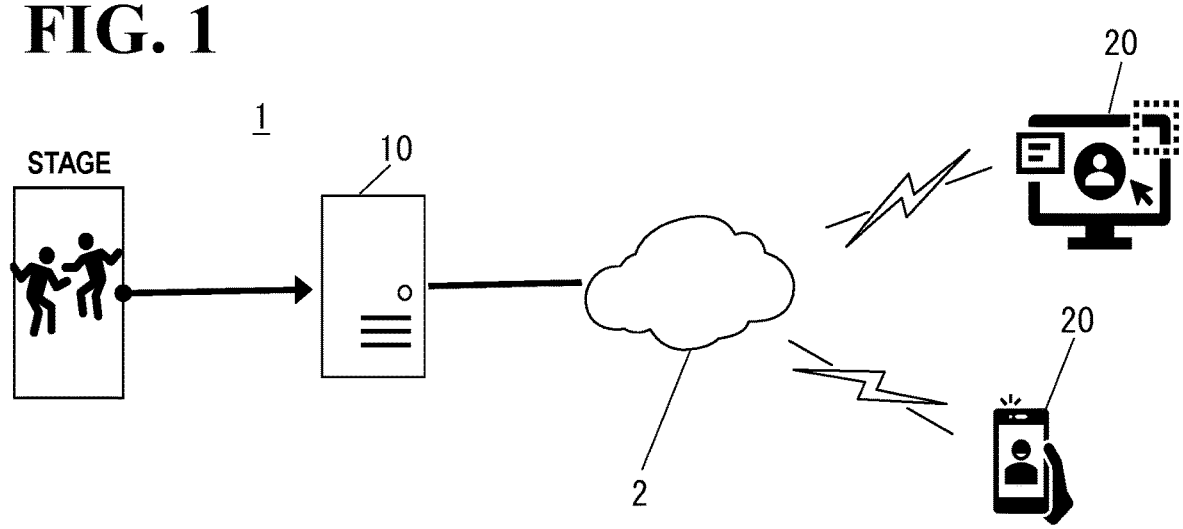
FIG. 1 is a schematic configuration diagram showing a network configuration of an online show rendition system of a first embodiment according to the present invention.

Hereinafter, a plurality of embodiments specifically disclosing an online show rendition system according to the present invention which automatically applies a rendition to online-delivered information in online delivery of a show, and further a laughter analysis device and a laughter analysis method according to the present invention which calculate a laughter-related emotion analysis value of a subject such as a user will be described in detail with reference to the accompanying drawings.

However, more detailed description than necessary may be omitted. For example, detailed description of already well-known matters or duplicative description of substantially the same configurations may be omitted. This is to avoid unnecessary verbosity in the following description and facilitate understanding by those skilled in the art. Also, each of the accompanying drawings should be viewed according to the orientation of the signs.

The accompanying drawings and the following description are provided to allow those skilled in the art to fully understand the present disclosure, and are not intended to limit the subject matter of the claims.

In the present embodiment, a show is described by exemplifying so-called "comedy" such as a comic dialogue and a skit at a theater or a stage, but the show is not limited to these comedy. The show may be an entertainment which gives weight to visual/recreational elements of the show and an event which is to be shown to people. The present invention can be appropriately applied to various shows other than "comedy", such as plays, concerts, live music, circuses, and lectures. Further, the present invention can also be appropriately applied to video images such as movies and television, game/sports delivery, various events, lectures, and the like.

Further, the "unit" or "device" referred to in the embodiments is not limited to a physical configuration to be mechanically implemented simply by hardware, but also includes a configuration whose function is implemented by software such as a program. Further, even if the function of one configuration is implemented by two or more physical configurations, or the functions of two or more configurations are implemented by one physical configuration (for example, one independent device), it does not matter.

The "user" referred to in the embodiments is interpreted synonymously with "viewer" or "spectator" in online delivery who is a "subject" in emotion analysis. Further, as described later, a laughter analysis device and a laughter analysis method according to the present invention are implemented as one function (user's emotion analysis unit 15 described later) of an online show rendition system.

The "gradual laughter" referred to in the embodiments is defined as a laughter that does not utter a laughing voice because the laughter-related emotion asymptotically emerges with taking the time, and the laughter-related expression also changes with taking the time as compared to normal laughter.

First Embodiment

A first embodiment of the online show rendition system 1 according to the present invention will be first described with reference to FIGS. 1 to 12.

<Regarding Network Configuration of Online Show Rendition System>

A network configuration of the online show rendition system 1 of the present embodiment will be described with reference to FIG. 1. FIG. 1 is a schematic configuration diagram showing the network configuration of the online show rendition system 1 of the present embodiment.

As shown in FIG. 1, the online show rendition system 1 of the present embodiment is configured to comprise a communication network 2, a management terminal device 10, and a plurality of user terminal devices 20. With such a configuration, a "comic" show played by a comedian or the like on a stage or the like is recorded (imaged/recorded or the like) by a broadcasting camera and a broadcasting microphone or the like, and a recording result is delivered online as information (communication data, digital data or the like) to a user terminal device 20 via the management terminal device 10 and the communication network 2.

The communication network 2 is connected to the management terminal device 10 and each of the plurality of user terminal devices 20, and is provided so that various information or signals can be mutually exchanged therebetween. Further, the communication network 2 is configured to include at least wired or wireless lines, and include a part or the whole of an Internet line. As a result, the communication network 2 is configured to allow mutual communication between the management terminal device 10 and the user terminal devices 20 and between the user terminal devices 20.

Note that the communication network 2 may appropriately include a local area network (LAN), a wide area network (WAN), a mobile telephone network (MTN), and other types of networks, which are interconnected and used to promote the communication between the management terminal device 10 and the user terminal devices 20.

The user terminal device 20 is configured to comprise an image output unit (for example, a monitor or the like, not shown), an audio output unit (for example, a speaker or the like, not shown), an imaging unit (for example, a camera or the like, not shown), and a sound recording unit (for example, a microphone or the like, not shown). As described above, the user terminal device 20 is configured to be capable of performing mutual information communication with the management terminal device 10 via the communication network 2, and causes the image output unit and the audio output unit to output online-delivered information, thereby allowing users to watch the show.

Further, the user terminal device 20 is configured to image expressions of a user as a subject to be analyzed by an imaging unit thereof during online watching, arbitrarily acquire a plurality of facial surface positions of the user based on an imaging result, and detect the motion of the user's expression (see below). Further, the imaging unit and the sound recording unit of the user terminal device 20 images and sound-records not only the user's expressions, but also the motion of the user's body and the type or volume of the user's utterance. Then, the user terminal device 20 transmits the results to the management terminal device 10 as personal video data m1, m2, m3, . . . via the communication network 2 and the information communication unit 18 (see below) of the management terminal device 10.

In the present embodiment, the user terminal device 20 is exemplified by a personal computer or a smart phone, but it is not limited to them. In addition to them, various devices such as a mobile phone, a tablet, a laptop computer, a netbook, a personal digital assistant (PDA), a gaming device, a media player or e-book may be adopted. As long as the user terminal device 20 can be connected to the communication network 2, the form of the information terminal device is not limited.

Also, in the present embodiment, the imaging unit (for example, a camera or the like) of the user terminal device 20 is used as a device for acquiring the user's facial surface position, but it is not limited to this device. As long as the device can detect the user's facial surface position, it is also possible to appropriately adopt an optical type position measurement device using special light such as a laser, a magnetic type position measuring measurement device, or the like.

In the present embodiment, main functions of the system according to the present invention are implemented in the management terminal device 10. The management terminal device 10 mutually communicates with the plurality of user terminal devices 20 through the communication network 2 to deliver shows online.

In the present embodiment, most of the functions of the system are implemented in the management terminal device 10, but the present invention is not limited to this style. For example, some or all of the functions of the management terminal device 10 described later may be implemented in the user terminal device 20, and each of the user terminal devices 20 may autonomously implement most of the functions of the system.

The management terminal device 10 is configured of a so-called general-purpose server computer. Programs stored and held as software in a storage unit (not shown) such as a ROM (Random Access Memory) and a RAM (Read Only Memory) of the computer are executed by a processing unit such as CPU (Central Processing Unit). Through such execution, the management terminal device 10 analyzes the state of the user based on the user's expressions, the motion of the user's body, the state of utterance, user information, and terminal information which are acquired by the user terminal device 20. The management terminal device 10 generates image information and audio information based on the analysis results and inserts them into the online delivery. This insertion makes it possible to enhance the sense of realism in the rendition of online delivery.

Note that the management terminal device 10 is not limited to the general-purpose server computer described above, and it may be configured of a computer such as a smart phone or a laptop computer like the user terminal device 20.

<Configuration of Management Terminal Device>

Figure 2:
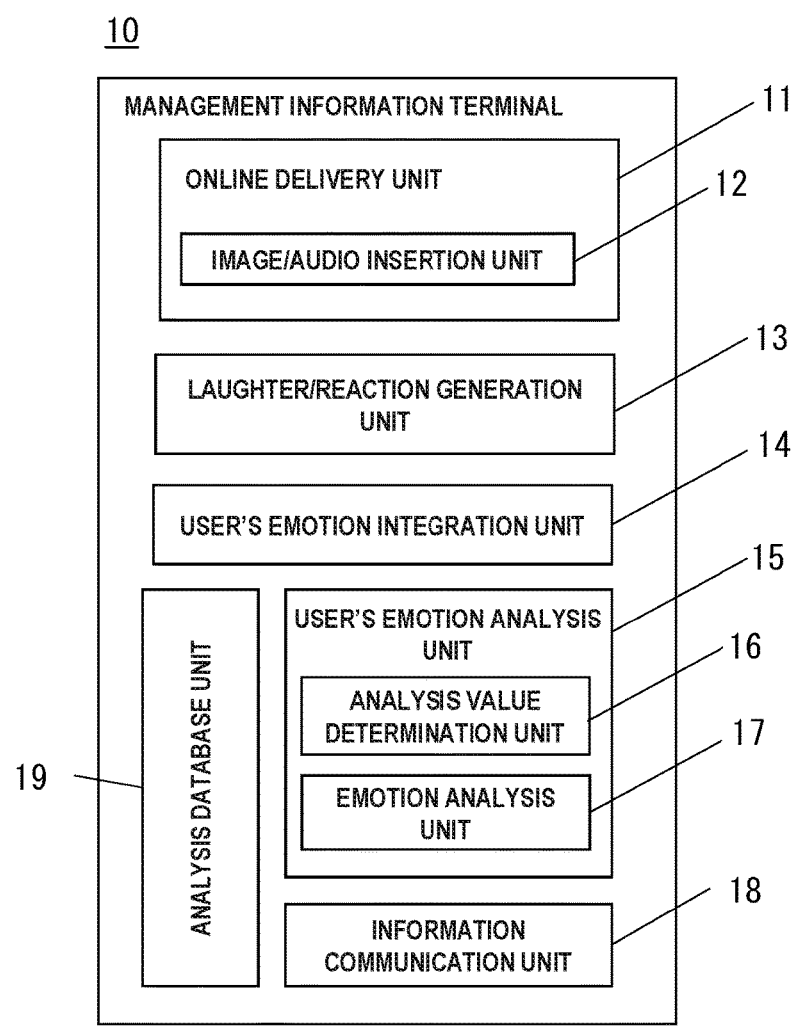
FIG. 2 is a block diagram showing the function of the management terminal device 10 shown in FIG. 1.

The configuration of the management terminal device 10 will be described with reference to FIG. 2. FIG. 2 is a block diagram showing the function of the management terminal device 10 shown in FIG. 1.

As shown in FIG. 2, the management terminal device 10 has a processing unit (not shown), and the processing unit executes various processing related to the operation of online delivery. Further, in the processing unit, for example, a processor as a hardware configuration executes various programs, thereby implementing various functions. In the present embodiment, the functions (programs) to be implemented in the processing unit of the management terminal device 10 are configured to comprise an online delivery unit 11, a laughter/reaction generation unit 13, a user's emotion integration unit 14 (an example of a laughter analysis device), a user's emotion analysis unit 15, an analysis database unit 19 (an example of a database), and an information communication unit 18.

The analysis database unit 19 stores location information, volume information, number-of-seats information, space information, and expected number-of-spectators information of real or virtual venues where shows are held. In other words, the analysis database unit 19 is provided as a condition database for summarizing changes in laughter or voices in an environment such as venue conditions such as indoor, outdoor, venue capacity, and location, or the number of inspectors in real or virtual venues where shows are held.

Note that the management terminal device 10 is configured to further comprise a storage unit (not shown), a display unit (not shown), and an operation unit (not shown) as well. The storage unit of the management terminal device 10 is configured to comprise various storage devices such as ROM and RAM which not only stores and holds the above-described various programs, but also is used as a working memory of the processing unit. Further, the storage unit of the management terminal device 10 may be configured to comprise a secondary storage device {for example, HDD (Hard Disk Drive), SSD (Solid State Drive)} or a tertiary storage device (for example, optical disk, SD card), and may be configured to comprise other storage devices.

The information communication unit 18 of the management terminal device 10 are connected to each of the plurality of user terminal devices 20 via the communication network 2. The management terminal device 10 exchanges various processing or communications necessary for online delivery with each of the plurality of user terminal devices 20 through the communication network 2 and the information communication unit 18 of the management terminal device 10. As a specific example, the information communication unit 18 of the management terminal device 10 transmits, to the user's emotion analysis unit 15 of the management terminal device 10, information such as the motion of the user's expressions, the motion of the user's body, and the type or volume of the user's utterance, which are obtained by each of the plurality of user terminal devices 20.

Examples of a communication method by the information communication unit 18 of the management terminal device 10 include, for example, a wired communication method such as WAN (Wide Area Network), LAN (Local Area Network) or power line communication or a wireless communication method such as Wi-Fi (Wireless Fidelity) or mobile communication for mobile phones, which are adaptable to the communication network 2.

Note that the communication method may be configured to appropriately include Bluetooth (registered trademark) in addition to the communication methods described above.

The online delivery unit 11 of the management terminal device 10 deliveries online a comedy show being performed by a comedian or the like on a stage or the like in real time. Specifically, the online delivery unit 11 of the processing unit appropriately digitally processes, in real time, information obtained by recording (imaging, sound-recording or the like) a show with a broadcasting camera, a broadcasting microphone, etc., and deliveries online the information to each of the plurality of user terminal devices 20 via the communication network 2.

Further, the online delivery unit 11 of the management terminal device 10 has an image/audio insertion unit 12. When performing online delivery, the image/audio insertion unit 12 appropriately inserts image information and audio information generated as described later into information to be delivered online to perform processing (superimposition processing). With this processing, when the user terminal device 20 outputs online-delivered information, the management terminal device 10 can cause the image output unit and the audio output unit of the user terminal device 20 to superimpose the generated image information and audio information on the online-delivered information and output them.

The user's emotion analysis unit 15 of the management terminal device 10 has an analysis value determination unit 16 and an emotion analysis unit 17. The user's emotion analysis unit 15 of the management terminal device 10 receives personal video data m1, m2, m3, . . . transmitted from the user terminal devices 20 via the information communication unit 18 of the management terminal device 10, and acquires information such as the motion of the user's expression, the motion of the user's body, and the type or volume of the user's utterance based on the personal video data m1, m2, m3, . . . (see FIG. 3).

As a result, the user's emotion analysis unit 15 of the management terminal device 10 analyzes the user's emotion based on the motion of the user's expression imaged by the imaging unit of the user terminal device 20 to calculate a first emotion analysis value (see below). Further, the user's emotion analysis unit 15 of the management terminal device 10 analyzes the user's motion based on the motion of the user's body imaged by the imaging unit of the user terminal device 20 to calculate a second emotion analysis value. Further, the user's emotion analysis unit 15 of the management terminal device 10 analyzes the user's reaction based on the type and volume of the user's utterance recorded by the sound recording unit of the user terminal device 20 to calculate a third emotion analysis value. Further, the user's emotion analysis unit 15 of the management terminal device 10 analyzes the user's attribute based on user information and terminal information acquired through the user terminal device 20 to calculate a user attribute analysis value.

As an example for the case where the user's emotion analysis unit 15 of the management terminal device 10 calculates the first emotion analysis value, the motion of facial muscle (the muscle of expression) and the degree of opening of the mouth indicating how the respective mouth corners of the user rise are obtained as a change in facial expression. Based on the obtained result, emotions such as laughter, joy, crying/sadness, and anger are evaluated to numerically express the first emotion analysis value.

Note that the degree of opening of the eyes or nose, the motion of the eyebrows, the presence or absence of tears, a change in the outline of the face, and accelerations at the time of changes thereof may also be acquired additionally, and the first emotion analysis value may be numerically expressed based on the obtained result.

When the user's emotion analysis unit 15 of the management terminal device 10 calculates the second emotion analysis value, motions of the body and the like such as nodding caused by "agreement" of each user, motions of the body such as "applause", "lean back", and "wipe away tears", and the accelerations in changes thereof are evaluated and numerically expressed as second emotion analysis values.

Further, when the user's emotion analysis unit 15 of the management terminal device 10 calculates the third emotion analysis value, the types of laughter such as "loud laughter", "meaningful smile", "surprised laughter", and "convinced (empathetic) laughter" of each user, voices representing emotions such as "crying voice" and "anger/yelling voice", the type of utterance or the volume of voices when making reactions thereof, the acceleration (differential increase) of the volume of voice/reaction and the like are evaluated and numerically expressed as the third emotion analysis values.

Further, when the user's emotion analysis unit 15 of the management terminal device 10 calculates the user attribute analysis value, features or differences in laughter or emotion, or reaction depending on nationality, race, gender, age, the period of generation, and the like are evaluated and numerically expressed as user attribute analysis values based on IP addresses or browsing locations and registration information of the user terminal devices 20.

As described above, the user's emotion analysis unit 15 of the management terminal device 10 calculates the first emotion analysis value, the second emotion analysis value, the third emotion analysis value, and the user attribute analysis value for each user, and transmits the calculation result to the user's emotion integration unit 14 of the management terminal device 10. The user's emotion integration unit 14 of the management terminal device 10 uses an emotion analysis algorithm to calculate individual comprehensive emotion analysis values p1, p2, p3, . . . (an example of comprehensive user's emotion analysis values) indicating the momentary amount of laughter and emotion and the quality of emotion for each individual user based on the calculation result, and transmits the calculation result to the laughter/reaction generation unit 13 of the management terminal device 10 (see FIG. 3).

The laughter/reaction generation unit 13 calculates individual laughter/reaction generation values w1, w2, w3, . . . based on the individual comprehensive emotion analysis values p1, p2, p3, . . . for each user while referring to a laughter/reaction derivation database unit (not shown) that is compiled into a database in advance. Further, in the present embodiment, the laughter/reaction generation unit 13 integrates the individual laughter/reaction generation values w1, w2, w3, . . . as aggregated data (data group) of all users, and refers to the analysis database unit 19 to generate a comprehensive laughter/reaction generation value W which is optimal for the venue environment of the show based on the referred result (see FIG. 3).

In the present embodiment, the individual laughter/reaction generation values w1, w2, w3, . . . , and the comprehensive laughter/reaction generation value W are set to the image information and the audio information as described above. The image information is telop information and numerical value information based on the comprehensive user's emotion analysis value. The audio information is laughter, applause or crying voice, or a sound representing surprise or agitation, or sounds or voices under other reactions.

<Regarding Cooperative Operation Between Management Terminal Device and User Terminal Device>

Figure 3:
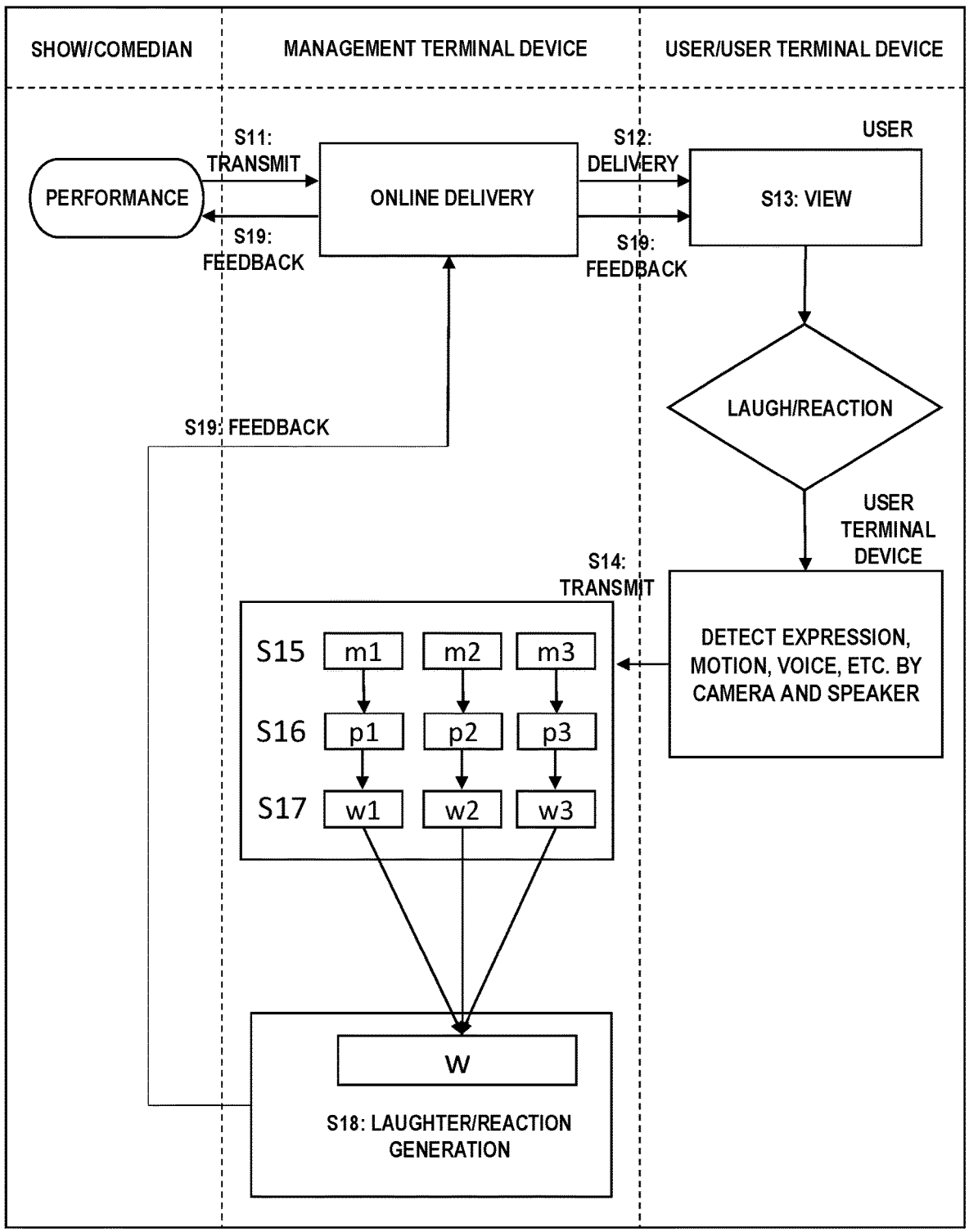
FIG. 3 is a flow diagram showing the cooperative operation between the management terminal device and the user terminal device in the first embodiment.

A flow of the cooperative operation between the management terminal device 10 and the user terminal device 20 in the present embodiment will be described with reference to FIG. 3. FIG. 3 is a flow diagram showing the cooperative operation between the management terminal device 10 and the user terminal device 20 in the present embodiment As shown in FIG. 3, performers such as comedians perform a program or performance on a stage or the like, and the state of the performance is imaged or recorded with a broadcasting camera and a broadcasting microphone or the like, and digitally processed so that the data thereof can be communicated as a program video (S11). The management terminal device 10 receives the program video through the communication network 2, and deliver online the program video to each of the user terminal devices 20 of a plurality of users (S12).

Each of the users views the program video via respective one of the user terminal devices 20 (S13). During viewing, each of the user terminal devices 20 individually captures images (video) and voices of the user under viewing by means of the imaging unit and sound recording unit thereof, and transmits them as personal video data m1, m2, m3, . . . to the management terminal device 10 (S14).

As described later, the user's emotion analysis unit 15 of the management terminal device 10 detects, extracts, analyzes, and numerically expresses momentary expressions, motions, and voices from the personal video data m1, m2, m3, . . . (S15).

At this time, the user's emotion analysis unit 15 of the management terminal device 10 analyzes the user's emotion based on the motion of the user's expression imaged by the imaging unit of the user terminal device 20 to calculate a first emotion analysis value. Further, the user's emotion analysis unit 15 of the management terminal device 10 analyzes the motion of the user's body imaged by the imaging unit of the user terminal device 20 to calculate a second emotion analysis value. Further, the user's emotion analysis unit 15 of the management terminal device 10 analyzes the user's reaction based on the type and volume of the user's utterance recorded by the sound recording unit of the user terminal device 20 to calculate a third emotion analysis value. Further, the user's emotion analysis unit 15 of the management terminal device 10 analyzes the user's attribute based on the user information and the terminal information acquired through the user terminal device 20 to calculate a user attribute analysis value.

Next, the user's emotion analysis unit 15 of the management terminal device 10 calculates the first emotion analysis value, the second emotion analysis value, the third emotion analysis value, and the user attribute analysis value for each user, and transmits the calculation result to the user's emotion integration unit 14 of the management terminal device 10.

The user's emotion integration unit 14 of the management terminal device 10 uses an emotion analysis algorithm to calculate individual comprehensive emotion analysis values p1, p2, p3, . . . (an example of the comprehensive user's emotion analysis values) indicating the momentary amount of laughter and emotion and the quality of emotion for each individual user based on the calculation result (S16).

The laughter/reaction generation unit 13 of the management terminal device 10 calculates individual laughter/reaction generation values w1, w2, w3, . . . based on the individual comprehensive emotion analysis values p1, p2, p3, . . . for each user while referring to a laughter/reaction derivation database unit that is compiled into a database in advance (S17). Further, the laughter/reaction generation unit 13 of the management terminal device 10 integrates the individual laughter/reaction generation values w1, w2, w3, . . . as aggregated data (data group) of all users, and refers to the analysis database unit 19 of the management terminal device 10 to generate a comprehensive laughter/reaction generation value W which is optimal for the venue environment of the show based on the referred result (S18).

When performing online delivery, the online delivery unit 11 of the management terminal device 10 appropriately inserts image information and audio information into information to be delivered online based on the thus-generated comprehensive laughter/reaction generation value W through the image/audio insertion unit 12 to perform processing (superimposition processing) (S19).

With this processing, when the user terminal device 20 outputs online-delivered information, the management terminal device 10 can cause the image output unit and the audio output unit of the user terminal device 20 to superimpose the image information and the sound information and output the information. In other words, the user views online delivery via the communication network 2 in a state where the image information (telop information and numerical value information (for example, graph, indicator or the like) based on the comprehensive user's emotion analysis value) and the audio information (laughter, sounds/voices under reaction) are superimposed.

<Regarding Basic Operation of Emotion Analysis by User's Emotion Analysis Unit>

Figure 4:
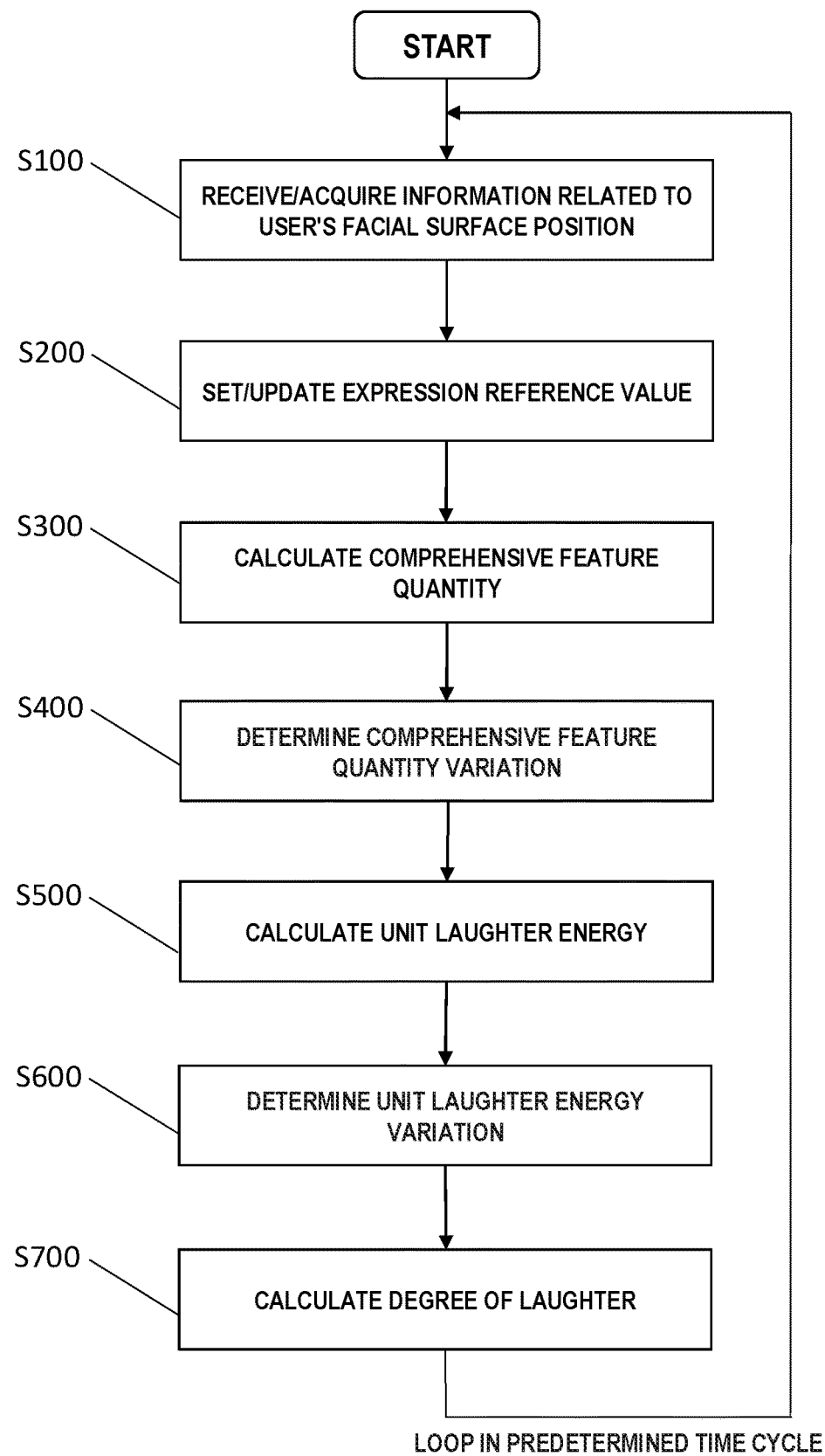
FIG. 4 is a flow diagram illustrating a main process executed by the user's emotion analysis unit of the management terminal device shown in FIG. 2.

With reference to FIG. 4, the basic operation of the user's laughter-related emotion analysis performed by the user's emotion analysis unit 15 of the management terminal device 10 will be described in more detail. FIG. 4 is a flowchart illustrating a main process executed by the user's emotion analysis unit 15 of the management terminal device 10 shown in FIG. 2.

As shown in FIG. 4, the user's emotion analysis unit 15 of the management terminal device 10 sequentially executes processes of S100 to S700 described later within one time cycle. In other words, the user's emotion analysis unit 15 of the management terminal device 10 executes these processes in a time cycle of a predetermined time while continuing (looping) the processes until the system or the device stops.

Information on the user's facial surface position acquired through the imaging unit is transmitted from the user terminal device 20, and the user's emotion analysis unit 15 of the management terminal device 10 receives these information (S100). In the present embodiment, a first facial surface position A1 corresponding to a root portion, on the user's eye side, of the user's zygomaticus major muscle and a plurality of second facial surface positions A21, A2, A23, . . . other than the root portion of the zygomaticus major muscle are acquired for each of the left and right facial surfaces of the user (see FIG. 6). Further, a plurality of third facial surface positions A31, A32, A33 . . . corresponding to the user's cheekbone fat, and a plurality of fourth facial surface positions A41, A42, A43 corresponding to the right and left mouth corners and the midpoint of the outer peripheral edge of the lower lip of the user are similarly acquired (see FIG. 6).

The user's emotion analysis unit 15 of the management terminal device 10 acquires the first facia surface position A1, the second facia surface positions A21, A22, A23, . . . , the third facial surface positions A31, A32, A33, . . . , and the fourth facial surface positions A41, A42, A43 in a time cycle of a predetermined time, calculates a comprehensive feature quantity C4 described later based on the thus-obtained result within that time cycle, and stores and holds the calculation result in the storage unit.

In the present embodiment, the comprehensive feature quantity C4 is set to a value that decreases as the expression becomes closer to that of a smile. Therefore, based on the comprehensive feature quantity C4 stored and held in the storage unit, the user's emotion analysis unit 15 of the management terminal device 10 evaluates, for example, the relation in magnitude of the comprehensive feature quantity C4 for each time cycle, and when determining that a value is greater than past values, that value is set as an expression reference value and updated (S200). In other words, the expression reference value is a value indicating the user's serious facial expression, and the expression reference value is used in the degree of laughter (an example of the total laughter energy) calculation subprocess described later.

In the present embodiment, the value of the comprehensive feature quantity C4 described above is set to decrease as the expression approaches the expression of laughter, but conversely, it may also be set to increase. In that case, it is sufficient only to change the comparison determination as to the relation in magnitude of the comprehensive feature quantity C4 in the subprocess described later accordingly. Even in this case, it is possible to obtain the same effect.

The user's emotion analysis unit 15 of the management terminal device 10 calculates the comprehensive feature quantity C4 related to the user's expression based on the first facia surface position A1, the second facia surface positions A21, A22, A23, . . . , the third facia surface positions A31, A32, A33, . . . and the fourth facia surface positions A41, A42, and A43 (S300, see below).

The user's emotion analysis unit 15 of the management terminal device 10 evaluates the change in expression by determining the relation in magnitude between the comprehensive feature quantity C4 of a current time cycle and that of the previous time cycle (S400, see below). In other words, based on the change of the comprehensive feature quantity C4, the user's emotion analysis unit 15 of the management terminal device 10 counts a temporal length of a state where the user's laughter has been high, whereby it is possible to identifying user's gradual laughter and momentary laughter (for example, roar of laughter).

The user's emotion analysis unit 15 of the management terminal device 10 calculates unit laughter energy according to a dynamic model based on the difference between the comprehensive feature quantity C4 of a current time cycle and the comprehensive feature quantity C4 of the previous time cycle (S500).

Examples of the dynamic model include a spring model, a spring mass point model, a spring damper model, a sigmoid function model and the like. In the present embodiment, in consideration of concepts such as electrophysiology and electro-mechanical models, laughter is treated as a work (energy) of muscles of expression that accompany the user's emotional output, and unit laughter energy is defined as a value indicating an energy amount of laughter (equivalent to the amount of work) per unit time cycle in the current time cycle.

Note that when a spring model is used as the dynamic model, parameters such as the elastic modulus thereof may be appropriately determined based on the dynamic characteristics of the user's muscle of expression.

The user's emotion analysis unit 15 of the management terminal device 10 determines, every predetermined time cycle, the relation in magnitude between the comprehensive feature quantity C4 calculated every predetermined time cycle and a first threshold value, and counts the number of consecutive times at which the same determination indicating "larger" or "smaller" has continued until a predetermined time cycle of interest since a previous predetermined time cycle (S600). Based on this count, the user's emotion analysis unit 15 of the management terminal device 10 determines variation in unit laughter energy (see below).

The user's emotion analysis unit 15 of the management terminal device 10 calculates the unit laughter energy by performing attenuation or the like according to the number of consecutive times. The user's emotion analysis unit 15 of the management terminal device 10 accumulatively adds the thus-calculated unit laughter energy every predetermined time cycle to calculate the degree of laughter (an example of the total laughter energy) (S700, see below). The first emotion analysis value relating to the user's laughter emotion is calculated based on the result of the above calculation result.

In this manner, the series of processes S100 to S700 are looped and executed as a main process (main routine) in a predetermined time cycle. This execution makes it possible for the user's emotion analysis unit 15 of the management terminal device 10 to quantitatively and accurately analyze the user's emotion, particularly the user's emotion concerning laughter based on the motion of the user's expression imaged by the imaging unit of the user terminal device 20, thereby calculating the first emotion analysis value.

<Regarding Comprehensive Feature Quantity Calculation Subprocess>

Figure 5:
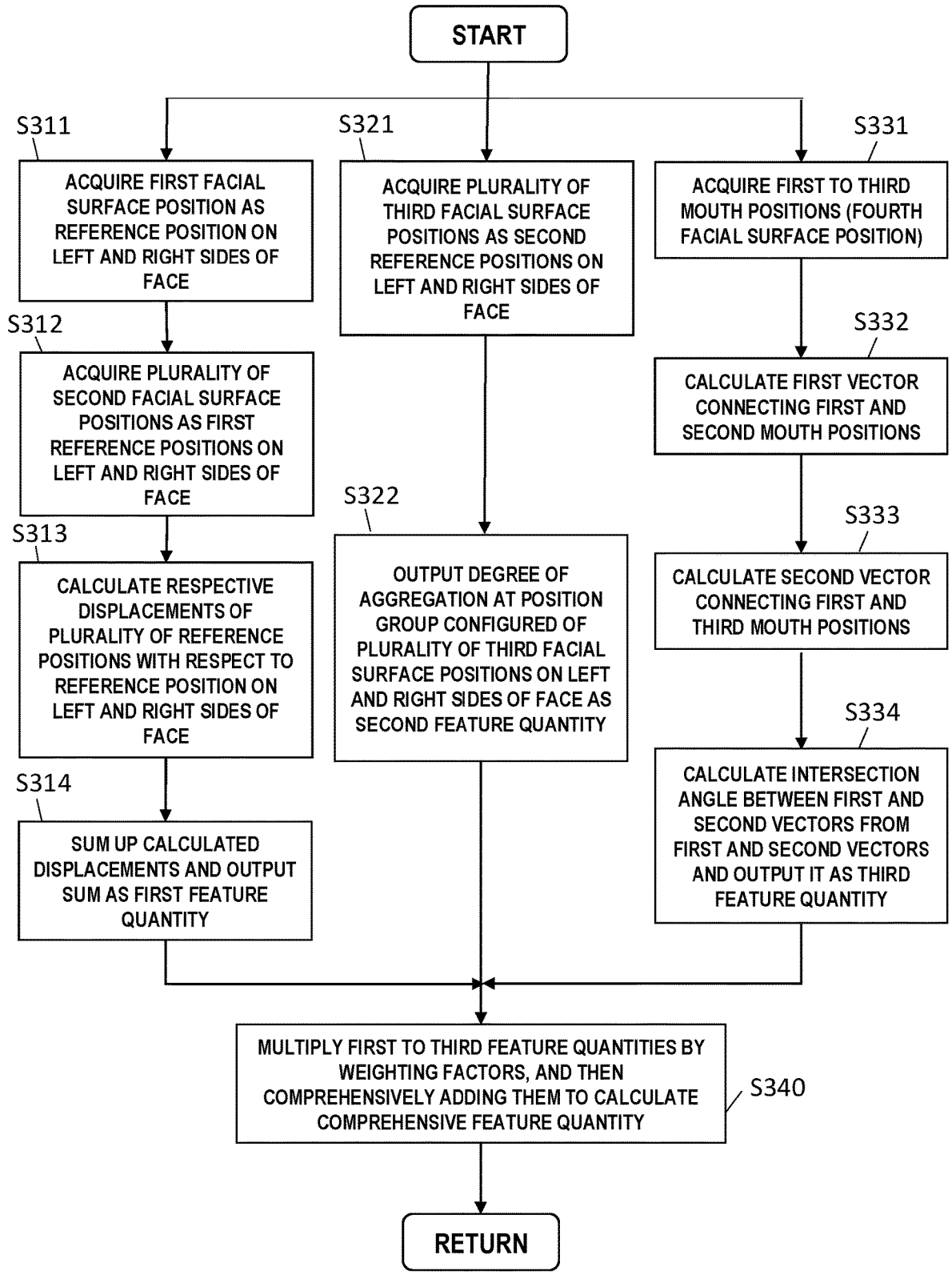
FIG. 5 is a flow diagram showing the comprehensive feature quantity calculation subprocess shown in FIG. 4.
Figure 6:
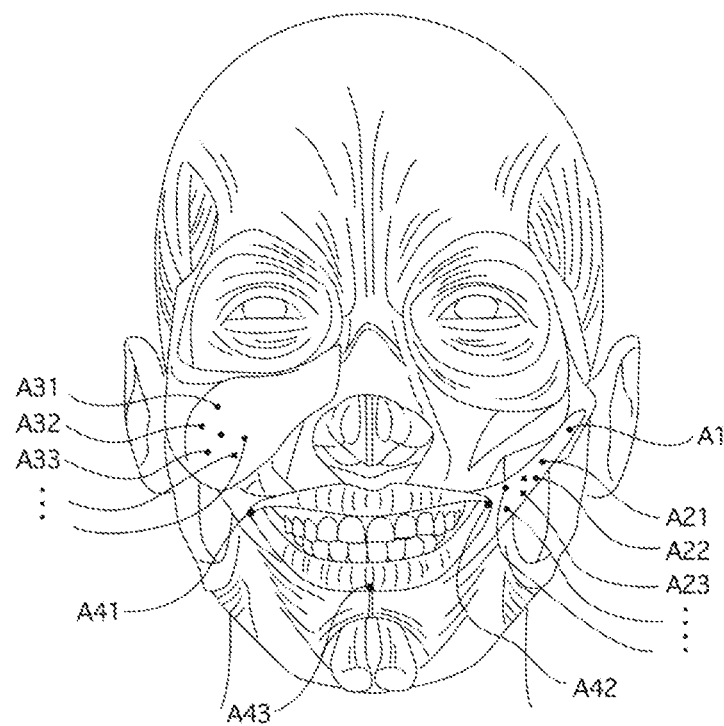
FIG. 6 is a schematic diagram of a face which illustrates the arrangement of the first facial surface position, the second facial surface positions and the third facial surface positions on the user's facial surface, and the positional relation of the fourth facial surface positions.
Figure 7:
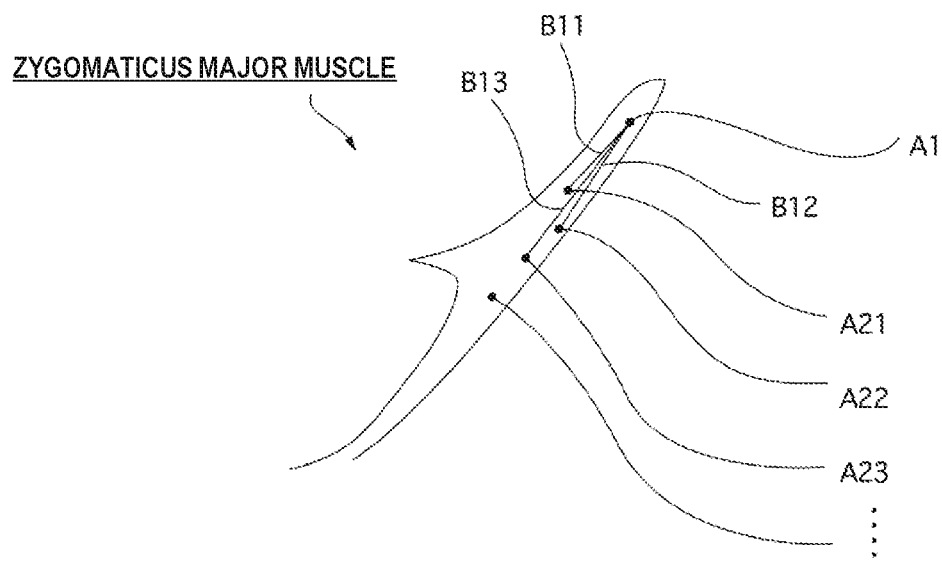
FIG. 7 is a schematic diagram showing a first feature quantity calculated based on the first facial surface position and the second facial surface position.
Figure 8:
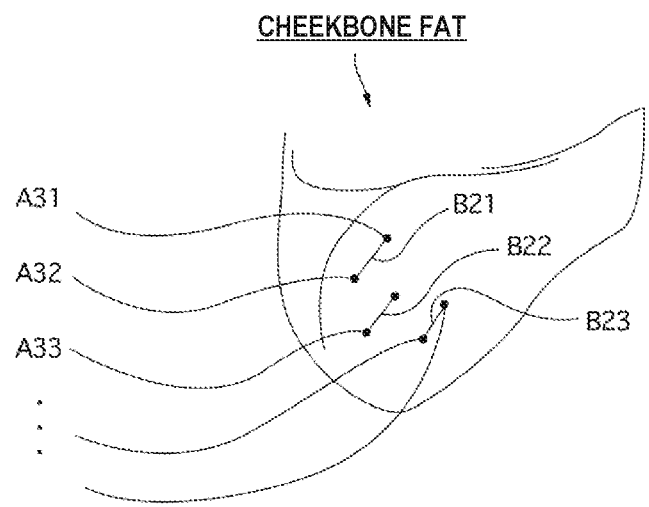
FIG. 8 is a schematic diagram showing a second feature quantity calculated based on the third face surface position.
Figure 9:
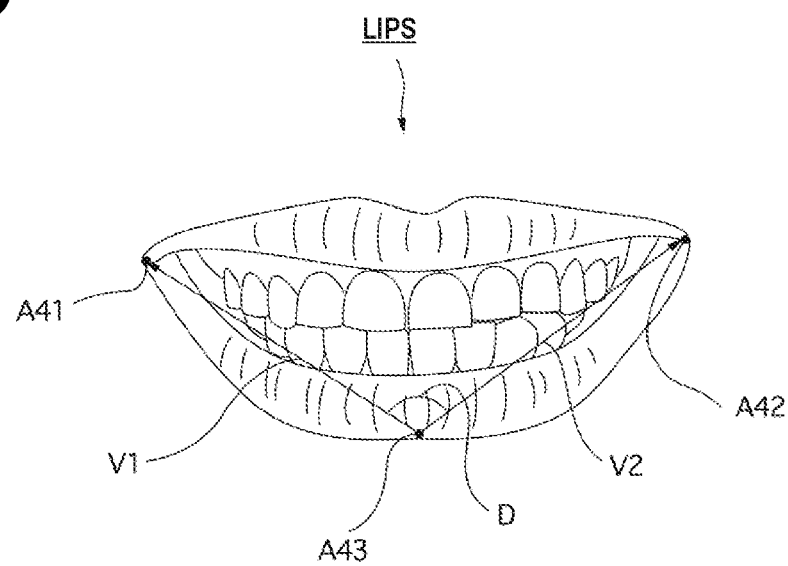
FIG. 9 is a schematic diagram showing a third feature quantity calculated based on the fourth facial surface positions.

A comprehensive feature quantity calculation subprocess (S300) will be described with reference to FIGS. 5 to 8. FIG. 5 is a flow diagram showing the comprehensive feature quantity calculation subprocess (S300) shown in FIG. 4. FIG. 6 is a schematic diagram of a face which illustrates the arrangement of the first facial surface position A1, the second facial surface positions A21, A22, A23, . . . and the third facial surface positions A31, A32, A33, . . . on the user's facial surface, and the positional relation of the fourth facial surface positions A41, A42, A43. FIG. 7 is a schematic diagram showing a first feature quantity C1 calculated based on the first facial surface position A1 and the second facial surface position A21. FIG. 8 is a schematic diagram showing a second feature quantity C2 calculated based on the third face surface position A31. FIG. 9 is a schematic diagram showing a third feature quantity C3 calculated based on the fourth facial surface positions A41, A42, A43.

As shown in FIGS. 5, 6, and 7, the user's emotion analysis unit 15 of the management terminal device 10 acquires, as a reference position, the first facial surface position A1 on each of the left and right sides of the user's face via the imaging unit of the user terminal device 20 (S311). Further, the user's emotion analysis unit 15 similarly acquires, as first reference positions, the plurality of second facial surface positions A21, A22, A23, . . . on each of the left and right sides of the face (S312).

The first facial surface position A1 is a position corresponding to a root portion, on the user's eye side, of the user's zygomaticus major muscle on each of the left and right sides of the face. The zygomaticus major muscle is connected to the cheekbone at the root portion of the eye, and when a person (user) laughs, the muscle contracts as a whole toward this root portion. As a result, it leads to a phenomenon (facial expression) in which the mouth corners rise. In other words, the first facial surface position A1 hardly changes on the facial surface even when the user makes a laughing expression. Therefore, in the present embodiment, the first facial surface position A1 is set as the reference position. On the other hand, each of the plurality of second facial surface positions A21, A22, A23, . . . is a position other than the root portion of the zygomaticus major muscle on each of the left and right sides of the face, and it moves (displaces) so as to approach to the root portion described above when the user laughs. Therefore, each of the plurality of second facial surface positions A21, A22, A23, . . . is set to the first reference positions (see FIGS. 6 and 7).

The user's emotion analysis unit 15 of the management terminal device 10 calculates respective displacements B11 (=|A21-A1|), B12 (=|A22-A1|), and B13 (=|A23-A1|) . . . of the second facial surface positions A21, A22, A23, . . . as the plurality of first reference positions with respect to the first facial surface position A1 as the reference position on both the left and right sides of the face (S313). The user's emotion analysis unit 15 of the management terminal device 10 sums up the thus-calculated displacements B11, B12, and B13, . . . , and outputs the sum as a first feature quantity C1 (=B11+B12+B13+ . . . ) (S314, see FIG. 7).

In parallel to the above calculation, the user's emotion analysis unit 15 of the management terminal device 10 similarly calculates a second feature quantity C2 related to the displacements B21, B22, and B23, . . . of the cheekbone fat of the user's face. In other words, the user's emotion analysis unit 15 of the management terminal device 10 acquires a plurality of third facial surface positions A31, A32, A33, . . . as second reference positions on each of the left and right sides of the user's face via the imaging unit of the user terminal device 20 (S321, see FIG. 8).

The plurality of third facial surface positions A31, A32, A33, . . . are positions corresponding to the cheekbone fat on each of the left and right sides of the face (see FIG. 6 and FIG. 8). The cheekbone fat is anatomically formed in a substantially dome shape and is arranged to cover a part of the zygomaticus major muscle from the surface side. Therefore, as described above, when the user laughs, the zygomaticus major muscle contracts, and this contraction causes the cheekbone fat to bulge outward (to the front side) of the facial surface. This bulge shortens the separation distances between the plurality of third facial surface positions A31. In other words, the degree of aggregation at a position group configured of the plurality of third facial surface positions A31, A32, A33, . . . (second reference positions) changes.

In the present embodiment, in order to quantify the degree of this aggregation, a plurality of pairs are set in the position group of the plurality of third facial surface positions A31, A32, A33, . . . , and displacements B21 (for example, B21=|A3M-A3N|{where M and N represent natural numbers and M≠N)}, B22, B23, . . . are calculated among the pairs. The user's emotion analysis unit 15 of the management terminal device 10 sums up the thus-calculated displacements B21, B22, B23, . . . , and outputs them as a second feature quantity (=B21+B22+B23+, . . . ) (S322, see FIG. 8).

In parallel to the above calculation, the user's emotion analysis unit 15 of the management terminal device 10 also calculates a third feature quantity C3 related to the shape of the user's mouth. In other words, the user's emotion analysis unit 15 of the management terminal device 10 acquires a first lip position A41, a second lip position A42 and a third lip position 43 of the user as the fourth facial surface positions A41, A42 and A43 via the imaging unit of the user terminal device 20 (S331).

As described above, the first lip position A41 and the second lip position A42 are facial surface positions of the left and right mouth corners of the user. The third lip position A43 is a facial surface position corresponding to the midpoint of the outer peripheral edge of the lower lip. When a person laughs, the mouth opens, and along with this opening, the lower lip approaches an arc shape with a small curvature. In other words, when a person laughs, the lower lip protrudes to the lower side of the face, and deforms in a substantially V-shape or a substantially U-shape. Due to this deformation, the intersection angle between a straight line connecting the third lip position A43 to the first lip position A41 and a straight line connecting the third lip position A43 to the second lip position A42 approaches an acute angle (see FIG. 9).

In other words, in the present embodiment, since the laughter-related emotion is quantified in terms of the shape of the user's mouth, the user's emotion analysis unit 15 of the management terminal device 10 calculates a first vector V1 connecting the third lip position A43 to the first lip position A41 (S332, see FIG. 9). The user's emotion analysis unit 15 of the management terminal device 10 also calculates a second vector V2 connecting the third lip position A43 to the second lip position A42 (S333, see FIG. 9). Based on the first thus-calculated vector V1 and second vector V2, the user's emotion analysis unit 15 calculates an intersection angle D (crossing angle) between the vectors (S334, see FIG. 9). The user's emotion analysis unit 15 outputs this intersection angle D as the third feature quantity C3.

The thus-calculated first feature quantity C1, second feature quantity C2, and third feature quantity C3 as described above are individually multiplied by weighting factors, and then added together to calculate a comprehensive feature quantity C4 (S340). When the user laughs, the value of each of the first feature quantity C1, the second feature quantity C2, and the third feature quantity C3 decreases, so that the comprehensive feature quantity C4 obtained by comprehensively adding these quantities likewise decreases when the user laughs. The difference between the comprehensive feature quantity C4 and the expression reference value described above represents the degree of change in the user's expression.

The comprehensive feature quantity C4 is calculated by the user's emotion analysis unit 15 in a predetermined time cycle, and stored and recorded in the storage unit of the management terminal device 10 in accordance with the time cycle. In the present embodiment, the first feature quantity C1, the second feature quantity C2, and the third feature quantity C3 are individually multiplied by weighting factors and added to one another to calculate the comprehensive feature quantity C4, but the comprehensive feature quantity C4 may include only the first feature quantity C1 and the second feature quantity C2 without including the third feature quantity C3. In this case, it is possible to obtain the same effect. Further, as described above, the comprehensive feature quantity C4 is set so that the value thereof decreases as the expression is closer to laughter expression. However, conversely, the comprehensive feature quantity C4 may be set so that the value thereof increases as the expression is closer to laughter expression. However, in this case, it is necessary to make corresponding changes in determining the relation in magnitude in the subprocess described later.

<Regarding Comprehensive Feature Quantity Variation Determination Subprocess>

Figure 10:
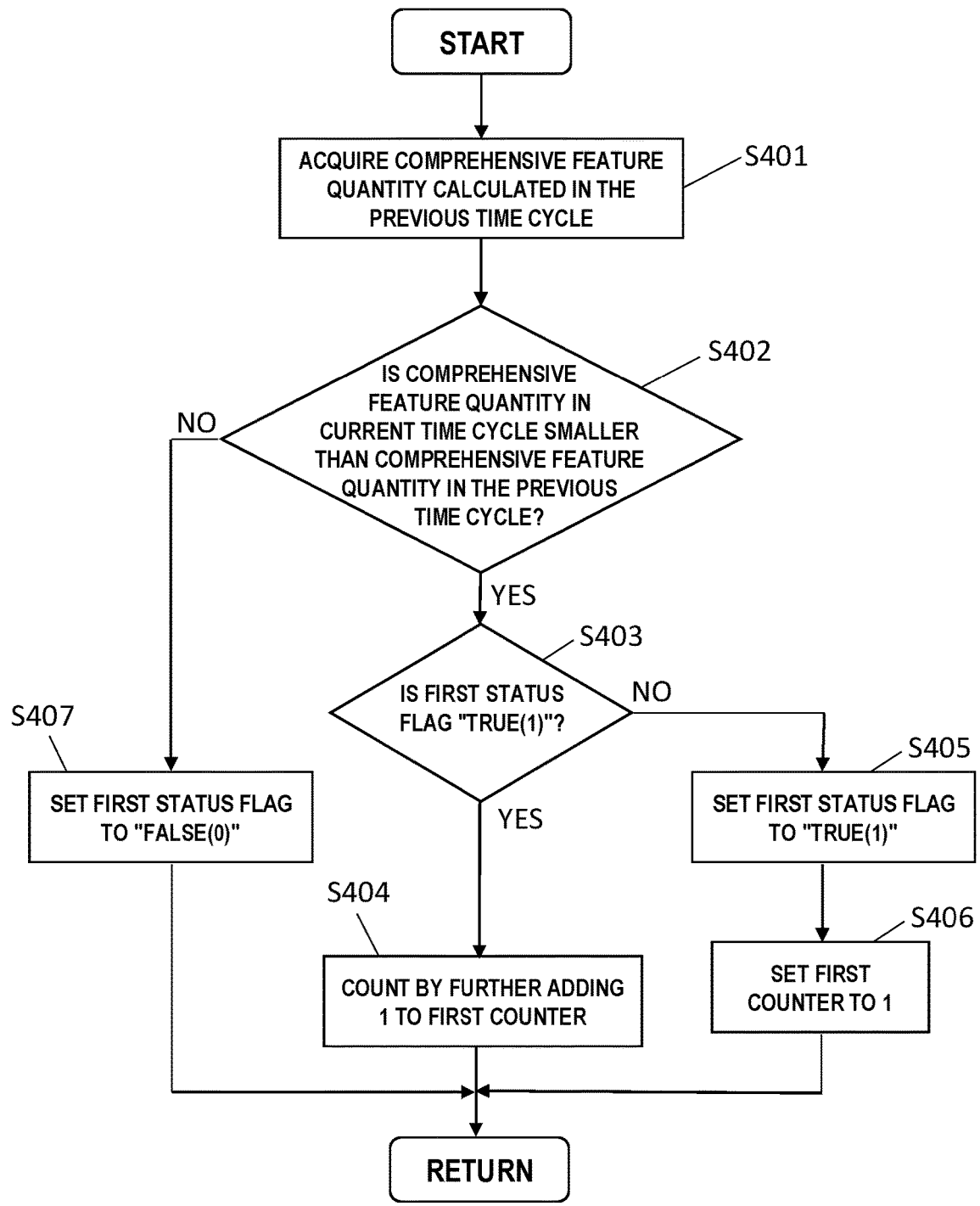
FIG. 10 is a flow diagram showing the comprehensive feature quantity variation determination subprocess shown in FIG. 4.

A comprehensive feature quantity variation determination subprocess (S400) will be described with reference to FIG. 10. FIG. 10 is a flow diagram showing the comprehensive feature quantity variation determination subprocess (S400) shown in FIG. 4.

Laughter is roughly classified into gradual laughter and momentary laughter (roar of laughter). In order to accurately identify these laughs, in the present embodiment, a first status flag and a first counter are set and used in the processing process (see below). The first status flag is a value (true/false value: "TRUE (1)" or {FALSE (0)}) indicating the presence or absence of laughter in the processing process. The first counter is a value (natural number) indicating the number of consecutive times of the laughing state in a predetermined time cycle. The first status flag and the first counter are stored and held in the storage unit of the management terminal device 10, and updated as appropriate (set to be rewritable).

As shown in FIG. 10, the user's emotion analysis unit 15 of the management terminal device 10 acquires a comprehensive feature quantity C4 calculated in the previous time cycle from the storage unit of the management terminal device 10 (S401). The user's emotion analysis unit 15 of the management terminal device 10 determines whether the comprehensive feature quantity C4 of the current time cycle calculated in the above-described comprehensive feature quantity calculation subprocess (S300) is smaller than the comprehensive feature quantity C4 in the previous time cycle (S402). In other words, the user's emotion analysis unit 15 of the management terminal device 10 determines whether the user's laughter is increasing from the viewpoint of expression. When the determination result indicates that the comprehensive feature quantity C4 at the current time is not smaller (is larger) than that in the previous time cycle (NO in S403), the user's emotion analysis unit 15 of the management terminal device 10 reads out the first status flag from the recording unit of the management terminal device 10, and sets the first status flag to "FALSE (0)" (false) (S407).

When it is determined that the comprehensive feature quantity C4 at the current time is smaller than that in the previous time cycle (YES in S402), the user's emotion analysis unit 15 of the management terminal device 10 reads out the first status flag from the recording unit of the management terminal device 10, and determines whether the first status flag is set to "TRUE (1)" (S403). When the determination result indicates that the first status flag is not set to "TRUE (1)" (NO in S403), the user's emotion analysis unit 15 of the management terminal device 10 updates and rewrites the first status flag to "TRUE (1)" (S405), and sets the first counter to "1" (S406).

On the other hand, when the first status flag is set to "TRUE (1)" (YES in S403), the user's emotion analysis unit 15 of the management terminal device 10 further adds "1" to the first counter, and counts the number of consecutive times (corresponding to the temporal length) of a state where the emotion of laughter has been high in a predetermined time cycle (S404). In other words, this addition process through the loop in the main process makes it possible for the user's emotion analysis unit 15 of the management terminal device 10 to count the number of consecutive times at which the comprehensive feature quantity C4 at the current time has continued to be smaller than that in the previous time cycle. In other words, the user's emotion analysis unit 15 of the management terminal device 10 counts the number of consecutive times at which the same determination indicating "smaller" or "larger" ("smaller" in the present embodiment) has continued until a predetermined time cycle of interest since a previous predetermined time cycle, whereby it is possible to detect the temporal length of the state where the user's laughter has been high.

As described above, by detecting the temporal length of the state where the user's laughter has been high, the user's emotion analysis unit 15 of the management terminal device 10 can identify the user's gradual laughter and momentary laughter (for example, roar of laughter) in a subsequent process.

<Regarding Unit Laughter Energy Variation Determination Sub-Process>

Figure 11:
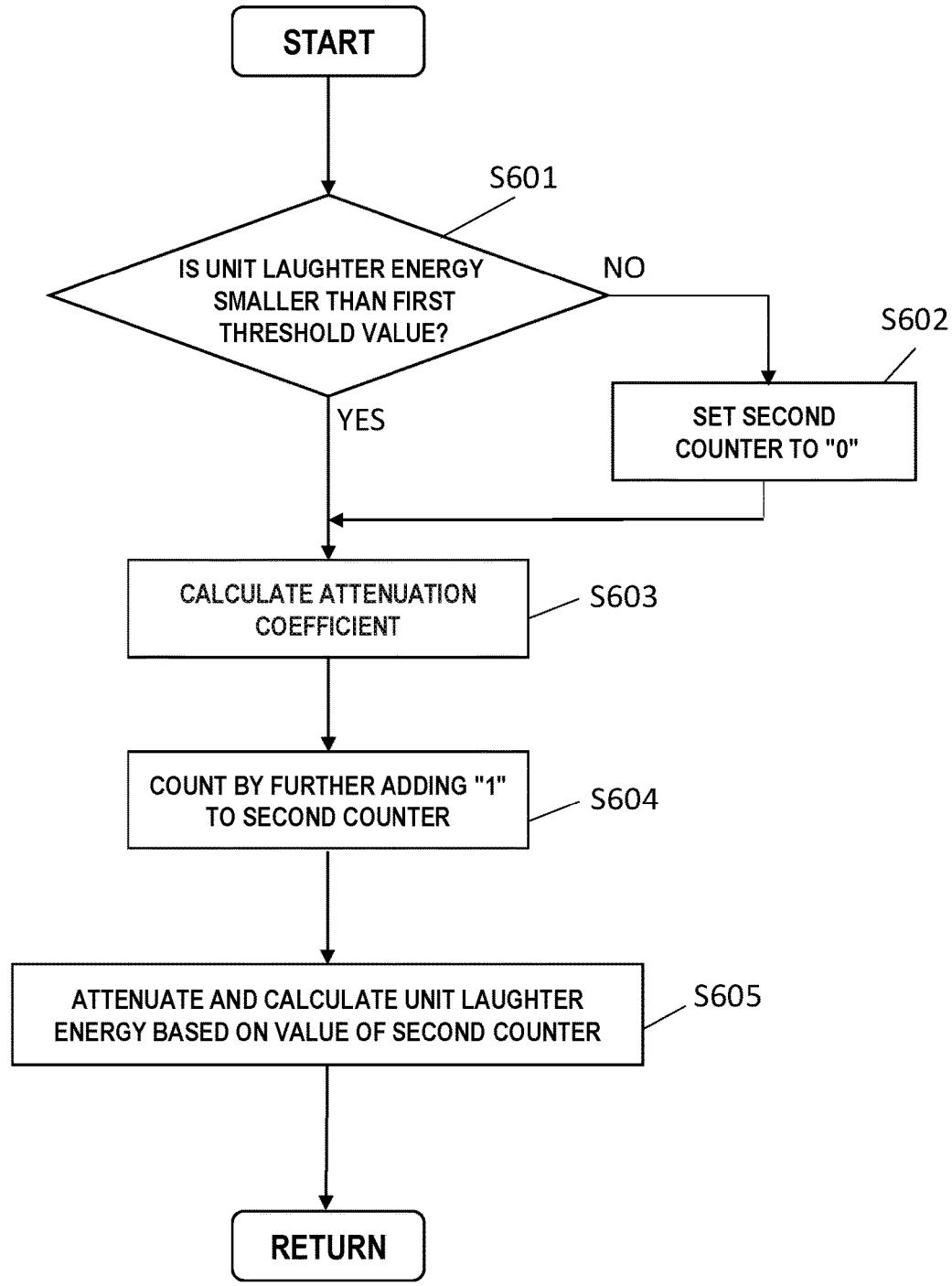
FIG. 11 is a flow diagram illustrating the unit laughter energy variation determination subprocess shown in FIG. 4.

A unit laughter energy variation determination subprocess (S600) will be described with reference to FIG. 11. FIG. 11 is a flow diagram illustrating the unit laughter energy variation determination subprocess (S600) shown in FIG. 4.

In the case of gradual laughter, the unit laughter energy is small, and when the state of gradual laughter is temporally long, it is estimated that the unit laughter energy attenuates with the passage of time. In order to reflect this in laughter-related emotion analysis, in the present embodiment, a first threshold value and a second counter are further set (see below). The first threshold value is a threshold value to be stored and held in advance in the storage unit of the management terminal device 10. The second counter is a value (natural number) indicating the number of consecutive times of the state of the gradual laughter in a predetermined time cycle.

As shown in FIG. 11, the user's emotion analysis unit 15 of the management terminal device 10 determines whether the unit laughter energy calculated in the current time cycle is smaller than the first threshold value (S601). When the determination result indicates that the unit laughter energy is not smaller, that is, is larger than the first threshold value (NO in S601), the user's emotion analysis unit 15 of the management terminal device 10 sets the second counter to "0" (initialize) (S602).

On the other hand, when the unit laughter energy is smaller than the first threshold value (YES in S601), the user's emotion analysis unit 15 of the management terminal device 10 calculates an attenuation coefficient to be used in a subsequent process (S603). The attenuation coefficient is calculated, for example, by a formula such as exp{-(damping ratio)-(second counter)}. As described above, when the state of gradual laughter continues, it is estimated that the user's laughter-related emotion attenuates over time. In order to reflect this attenuation phenomenon in the laughter energy to be finally calculated, an attenuation coefficient is set in the present embodiment, and used in the laughter degree calculation subprocess (see below). The attenuation coefficient is set in advance, and stored and held in the storage unit of the management terminal device 10.

Thereafter, the user's emotion analysis unit 15 of the management terminal device 10 further adds "1" to the second counter, and counts the number of consecutive times (corresponding to the temporal length) of the state of gradual laughter (S604). The user's emotion analysis unit 15 of the management terminal device 10 attenuates and updates the unit laughter energy calculated in the previous process based on the value of the second counter (S605).

In the present embodiment, this attenuation processing is executed by multiplying the reciprocal of the value of the second counter, for example.

As described above, by detecting a state in which the transition of the user's gradual laughter is temporally long, it is possible for the user's emotion analysis unit 15 of the management terminal device 10 to adaptively and quantitatively express the energy attenuation effect of laughter in the gradual laughter, and accurately analyze the user's laughter-related emotion.

<Regarding Laughter Degree Calculation Sub-Process>

Figure 12:
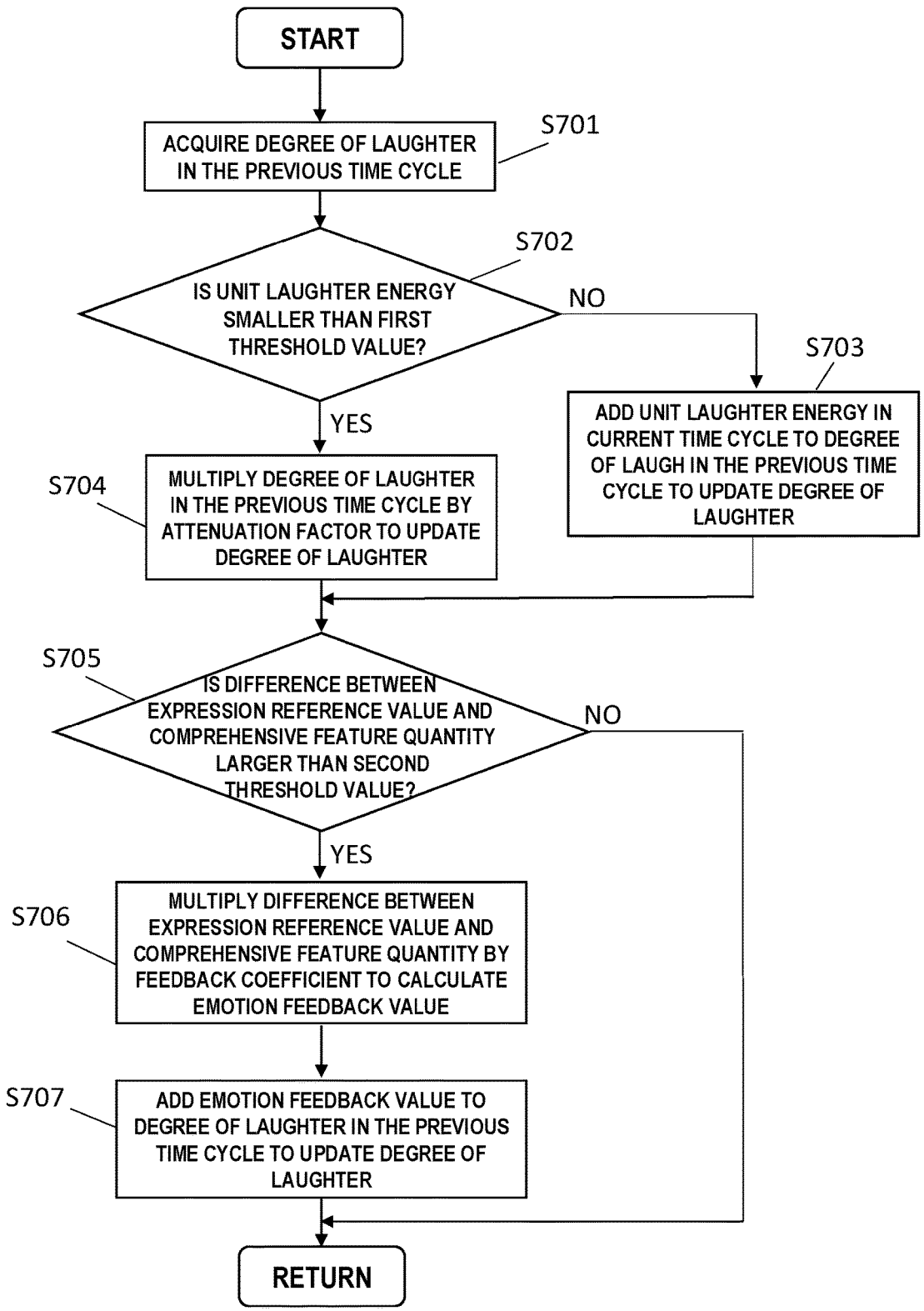
FIG. 12 is a flow diagram illustrating the laughter degree calculation subprocess shown in FIG. 4.

A laughter degree calculation subprocess (S700) will be described with reference to FIG. 12. FIG. 12 is a flow diagram illustrating the laughter degree calculation subprocess (S700) shown in FIG. 4.

In this subprocess, the first threshold value is also used to determine whether laughter energy (i.e., unit laughter energy) occurs, that is, transition of the laughter state occurs. Further, when the emotion of laughter occurs, a person contracts his/her muscle of expression, and has a laughing expression. Conversely, when a person has a laughing expression, there occurs an emotional feedback phenomenon in which the laughing emotion is made higher in response to the laughing expression. Therefore, in this embodiment, a second threshold value and a feedback coefficient are set in advance, and the emotional feedback phenomenon is quantitatively expressed by the second threshold value and the feedback coefficient (see below). The second threshold value and the feedback coefficient are stored and held in the storage unit of the management terminal device 10. The second threshold value is used to determine whether the expression of the current time cycle (corresponding to the comprehensive feature quantity C4) has changed significantly as compared to the serious expression (corresponding to the expression reference value). The feedback coefficient is defined as a ratio, and is a positive value which is set (adjusted) in advance and is less than "1".

As shown in FIG. 12, the user's emotion analysis unit 15 of the management terminal device 10 acquires the degree of laughter (an example of the total laughter energy) in the previous time cycle (S701). As described later, the degree of laughter is calculated every predetermined time cycle, and the thus-calculated degree of laughter is stored and recorded in the storage unit of the management terminal device 10 in accordance with the time cycle.

The user's emotion analysis unit 15 of the management terminal device 10 determines whether the unit laughter energy is smaller than the first threshold value (S702). When the determination result indicates that the unit laughter energy is not smaller (is larger) than the first threshold value, that is, it is estimated that the state is not a gradual laughter state (NO in S702), the user's emotion analysis unit 15 of the management terminal device 10 adds the unit laughter energy calculated in the current time cycle to the degree of laughter in the previous time cycle to update the degree of laughter (S703). On the other hand, when it is determined that the unit laughter energy is smaller than the first threshold value, that is, it is estimated that the state is a gradual laughter state (YES in S702), the user's emotion analysis unit 15 of the management terminal device 10 multiplies the degree of laughter in the previous time cycle by the attenuation coefficient described above to update the degree of laughter (S704).

The user's emotion analysis unit 15 of the management terminal device 10 calculates the difference between the expression reference value and the comprehensive feature quantity C4, and determines whether this difference is larger than the second threshold value (S705). When the determination result indicates that the difference is larger than the second threshold value (YES in S705), the user's emotion analysis unit 15 of the management terminal device 10 multiplies the difference between the expression reference value and the comprehensive feature quantity C4 by the feedback coefficient to calculate an emotional feedback value (S706). The user's emotion analysis unit 15 of the management terminal device 10 adds the emotion feedback value to the degree of laughter in the previous time cycle to update the degree of laugh (S707). In the present embodiment, the thus-calculated degree of laughter is handled as a value which is the same as or linearly correlated with the aforementioned emotion analysis value (specifically, the first emotion analysis value).

When it is determined that the aforementioned difference is smaller than the second threshold value (NO in S705), this subprocess ends, and returns to the main process (RETURN).

In this way, it is possible to adaptively and quantitatively express the attenuation effect of laughter energy in gradual laughter and the attenuation of emotion in a stationary state of laughter (a state in which the laughter expression is approximately the same level), and analyze the user's laughter-related emotion with high accuracy. Regarding the emotional feedback phenomenon in which the emotion of laughter is made higher in response to a person's expression, by determining whether the expression in the current time cycle has changed significantly as compared to the serious face, it is likewise possible to adaptively and quantitatively express the emotion feedback phenomenon thereof.

<Regarding Advantages of Present Embodiment>

As described above, the online show rendition system 1 of the present embodiment comprises a management terminal device 10 for delivering a show online, and a plurality of user terminal devices 20 each of which comprises an image output unit, an audio output unit, an imaging unit, and a sound recording unit, is configured to be capable of mutually communicating information with the management terminal device 10, and outputs online-delivered information to the image output unit and the audio output unit to allow a user to view the show. The management terminal device 10 analyzes the user's emotion based on the motion of the user's expression imaged by the imaging unit of the user terminal device 20 to calculate a first emotion analysis value, analyzes the user's motion based on the motion of the user's body imaged by the imaging unit of the user terminal device 20 to calculate a second emotion analysis value, analyzes the user's reaction based on the type and volume of the user's utterance recorded by the sound recording unit of the user terminal device 20 to calculate a third emotion analysis value, analyzes the user's attribute based on user information and terminal information acquired through the user terminal device 20 to calculate a user attribute analysis value, calculates a comprehensive user's emotion analysis value based on the first emotion analysis value, the second emotion analysis value, the third emotion analysis value and the user attribute analysis value for each user, generates image information and audio information based on a plurality of comprehensive user's emotion analysis values in at least some of all users, and causes the image output unit and the audio output unit of the user terminal device 20 to output online-delivered information with the image information and the audio information superimposed on the online-delivered information when the user terminal device 20 outputs the online-delivered information.

Therefore, more easily, tallies and numerically expresses viewers' realistic expressions, feelings, and reactions in online delivery of shows such as stages and programs, and inserting appropriately measured and timed laughter and reactions into the online delivery based on numerical values thereof, whereby it is possible to share laughter or reactions/emotions with other viewers and enhance a sense of reality.

Further, according to the present embodiment, the management terminal device 10 further includes a database in which at least one of location information, volume information, number-of-seats information, space information and expected number-of-spectators information of real or virtual venues where shows are held is stored. When generating image information and/or audio information, the management terminal device 10 also refers to the database to generate image information and/or audio information. Therefore, in consideration of information on a real or virtual venue where a show is held, and generates image information and/or audio information to be fed back to the venue of the show, so that the sense of reality can be further enhanced.

According to the present embodiment, the screen information is at least one of telop information and numerical value information based on the comprehensive user's emotion analysis value, so that laughter or reactions/emotions can be easily shared with other viewers.

Further, according to the present embodiment, at least the first facial surface position A1 corresponding to the root portion, on the user's eye side, of the user's zygomaticus major muscle, and the plurality of second facial surface positions A21, A22, A23, . . . corresponding to portions other than the root portion of the zygomaticus major muscle on the left and right sides of the face of a user (an example of a subject) are obtained. After the first facial surface position A1 is set as a reference position and each of the second facial surface positions A21, A22, and A23, . . . is set as a first reference position, each of displacements B11, B12, B13, . . . between the first reference positions and the reference position is calculated in a predetermined time cycle, and the displacements B11, B12, and B13, . . . are summed up every predetermined time cycle to calculate a first feature quantity C1. The user's laughter-related emotion analysis value is calculated based on the first feature quantity C1.

Therefore, the user's laughter-related emotion is analyzed based on the first facial surface position A1 corresponding to the root portion, on the user's eye side, of the user's zygomaticus major muscle, and the plurality of second facial surface positions A21, A22, A23, . . . corresponding to the portions other than the root portion of the zygomaticus major muscle on the left and right sides of the face of a user (an example of a subject). As a result, it is possible to quantitatively and accurately analyze the laughter-related expressions or emotions of people (users such as viewers), and simplify handling in the analysis, thereby enhancing the efficiency of the analysis work.

Further, according to the present embodiment, a plurality of third facial surface positions A31, A32, A33, . . . corresponding to the user's cheekbone fat on the left and right sides of the face of a user (an example of a subject) are further acquired. After each of the plurality of third facial surface positions A31, A32, A33, . . . is set as a second reference position, and a second feature quantity C2 is calculated based on the degree of aggregation at a position group configured of the second reference positions in a predetermined time cycle. An emotion analysis value is calculated based on the first feature quantity C1 and the second feature quantity C2.

Therefore, a plurality of third facial surface positions A31, A32, A33, . . . corresponding to the user's cheekbone fat on at least one of the left and right sides of the user's face are further acquired to analyze the laughter-related emotion. As a result, a human's laughter-related expressions and emotions can be analyzed with higher accuracy.

Further, according to the present embodiment, a plurality of pairs is set at the position group, and the displacements B21, B22, B23, . . . are calculated between the respective pairs, and the thus-calculated respective displacements B21, B22, B23, . . . are summed up in a predetermined time cycle to calculate the degree of aggregation described above. Therefore, the degree of aggregation can be calculated more easily.

Further, according to the present embodiment, in a predetermined time cycle, at least the first feature quantity C1 and the second feature quantity C2 (in the present embodiment, the first feature quantity C1, the second feature quantity C2, and the third feature quantity C3) are respectively multiplied by predetermined weighting factors which are individually set for the respective feature quantities, and then added together to calculate a comprehensive feature quantity C4. Unit laughter energy indicating an energy amount associated with laughter per unit time cycle in the predetermined time cycle is calculated according to a predetermined dynamic model based on the difference between the comprehensive feature quantity C4 in a predetermined time cycle and the comprehensive feature quantity C4 in the previous time cycle with respect to the predetermined time cycle. The unit laughter energy is cumulatively added every predetermined time cycle to calculate the degree of laughter (an example of the total laughter energy) up to the predetermined time cycle. An emotion analysis value is calculated based on the degree of laughter. Therefore, analysis is performed according to a predetermined dynamic model based on the difference between the comprehensive feature quantity C4 in a predetermined time cycle and the comprehensive feature quantity C4 in the previous time cycle with respect to the predetermined time cycle. As a result, a human's laughter-related expressions and emotions can be analyzed more surely and accurately.

According to the present embodiment, the relation in magnitude between the comprehensive feature quantity C4 calculated every predetermined time cycle and the first threshold value is determined every predetermined time cycle, and also counts the number of consecutive times at which the same determination indicating "larger" or "smaller" ("smaller" in the present embodiment) has continued until a predetermined time cycle of interest since a previous predetermined time cycle. The unit laughter energy is calculated by attenuation according to the number of consecutive times. For this reason, by detecting a state in which transition of laughter is temporally long, such as gradual laughter of a subject (a user such as a viewer), the energy attenuation related to laughter and the attenuation phenomenon of emotions in the same level laughter state are adaptively and quantitatively expressed, whereby it is possible to more accurately analyze the user's laughter-related emotions.

Further, according to the present embodiment, it is determined every predetermined time cycle whether the unit laughter energy calculated every predetermined time cycle is larger than the second threshold value. When it is determined that the unit laughter energy is larger than the second threshold value, the unit laughter energy in a predetermined time cycle of interest is added to the degree of laughter (an example of the total laughter energy) calculated in the previous time cycle with respect to the predetermined time cycle to calculate the degree of laughter in the predetermined time cycle of interest. When it is determined that the unit laughter energy is not larger than the second threshold, the degree of laughter calculated in the previous cycle period with respect to the predetermined time period of interest is attenuated to calculate to be set as the degree of laughter until the predetermined time cycle of interest. Therefore, it is possible to adaptively and quantitatively express the emotion attenuation in the laughter-related emotion, and analyze the user's laughter-related emotion with higher accuracy.

Second Embodiment

Next, a second embodiment of the online show rendition system 1 according to the present invention will be described with reference to FIGS. 13 to 15.

The same as or equivalent parts to those of the above-described first embodiment are denoted by the same as or equivalent signs to signs in the figures, and the description thereof is omitted or simplified.

<Regarding Configurations of Management Terminal Device and User Terminal Device>

Configurations of the management terminal device 10 and the user terminal device 20 will be described with reference to FIGS. 13 and 14. FIG. 13 is a block diagram showing the functions of the management terminal device 10 of the present embodiment. FIG. 14 is a block diagram showing the functions of the user terminal device 20 of the present embodiment.

Figure 13:
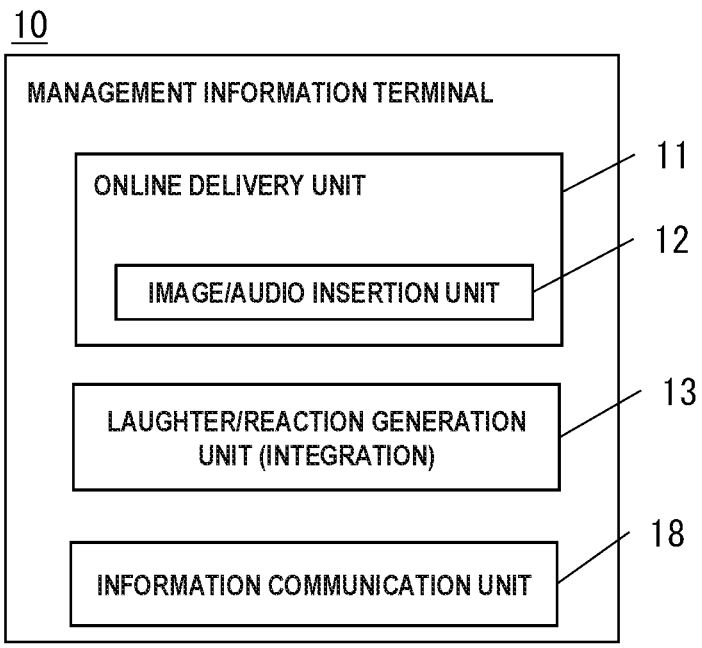
FIG. 13 is a block diagram showing the functions of the management terminal device of a second embodiment according to the present invention.
Figure 14:
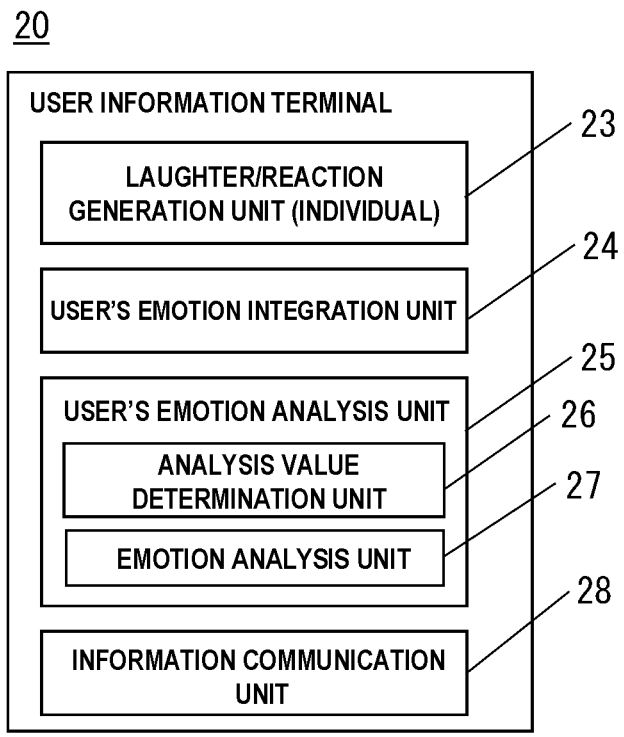
FIG. 14 is a block diagram showing the functions of the user terminal device of a second embodiment according to the present invention.
Figure 15:
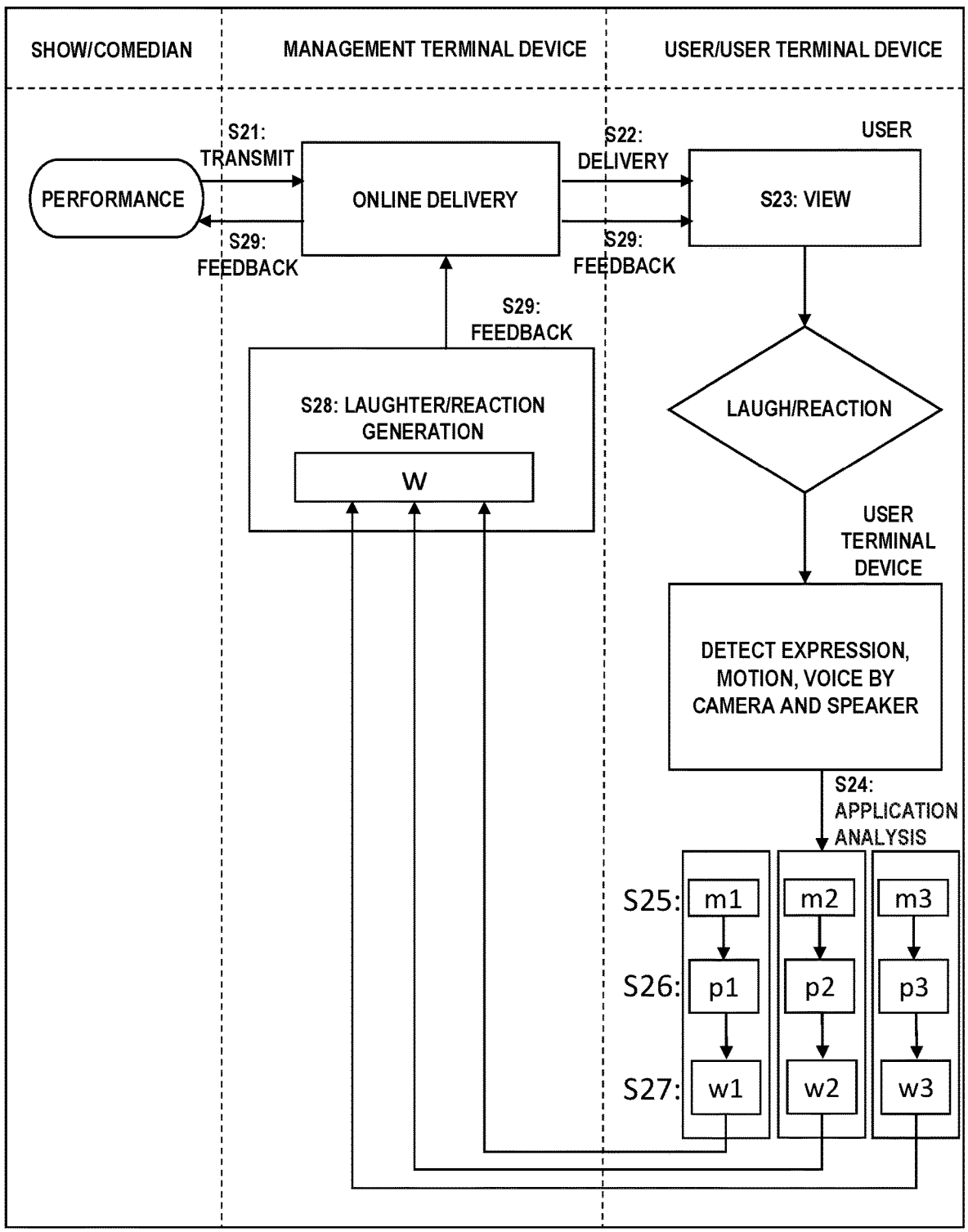
FIG. 15 is a flow diagram showing the cooperative operation between the management terminal device and the user terminal device in the second embodiment.

As shown in FIGS. 13 and 14, in the present embodiment, the user's emotion integration unit (14) and the user's emotion analysis unit (15) equipped in the management terminal device 10 of the first embodiment are transferred to the user terminal device 20, and they are not equipped in the management terminal device 10 of the present embodiment.

Further, some of the functions of the laughter/reaction generation unit 13 of the management terminal device 10 are transferred to the user terminal device 20.

In other words, the processing unit of the management terminal device 10 of the present embodiment is configured to comprise the online delivery unit 11, the laughter/reaction generation unit 13, and the information communication unit 18 as the functions to be implemented by the processing unit while sharing them with the first embodiment. The processing of the user terminal device 20 of the present embodiment is configured to comprise a laughter/reaction generation unit 23, a user's emotion integration unit 24, a user's emotion analysis unit 25, and an information communication unit 28 as functions to be implemented by the processing unit.

Each of these functional units performs a similar function (processing) to that of each of the functional units of the management terminal device 10 of the first embodiment on the user terminal device 20 side. However, the laughter/reaction generation unit 23 of the user terminal device 20 calculates individual laughter/reaction generation values w1, w2, w3, . . . based on the individual comprehensive emotion analysis values p1, p2, p3, . . . for each user while referring to the laughter/reaction derivation database unit described above. Then, the laughter/reaction generation unit 13 of the management terminal device 10 integrates the individual laughter/reaction generation values w1, w2, and w3 as set data (data group) of all users, refers to the analysis database unit 19 (see FIG. 2), and generates a comprehensive laughter/reaction generation value W optimum to the venue environment of a show based on a result of the reference.

Note that the laughter/reaction generation unit 23, the user's emotion integration unit 24, and the user's emotion analysis unit 25 of the user terminal device 20 are implemented as application software of the user terminal device 20 (hereinafter simply referred to as "application").

<Regarding Cooperative Operation Between Management Terminal Device and User Terminal Device>

A flow of a cooperative operation between the management terminal device 10 and the user terminal device 20 in the present embodiment will be described with reference to FIG. 15. FIG. 15 is a flow diagram showing the cooperative operation between the management terminal device 10 and the user terminal device 20 in the present embodiment As shown in FIG. 15, an entertainer such as a comedian performs a program or performance on a stage or the like, and the performance is imaged and recorded by a broadcasting camera and a broadcasting microphone or the like and digitally processed so that it can be communicated as a program video data (S21). The management terminal device 10 receives the program video through the communication network 2, and delivers the program video online to each of the user terminal devices 20 of a plurality of users (S22).

Each of the users views the program video via respective one of the user terminal devices 20 (S23). When viewing, each of the user terminal devices 20 individually captures images (video) and voices of the viewing user by the imaging unit and the sound recording unit thereof, and digitally processes them for each user terminal device 20 as personal video data m1, m2, m3, . . . , which are stored and held in the storage unit thereof (S24).

In each of the user terminal devices 20, the user's emotion analysis unit 25 of the user terminal device 20, as each application, individually detects, extracts, analyzes and numerically expresses momentary expression, motion and voice from each of the personal video data m1, m2, m3, . . . as described later (S25).

At this time, as in the case of the first embodiment, in each of the user terminal devices 20, the user's emotion analysis unit 25 of the user terminal device 20 analyzes the user's emotion based on the motion of the user's expression imaged by the imaging unit of the user terminal device 20 to calculate a first emotion analysis value for each user. Further, the user's emotion analysis unit 25 of the user terminal device 20 analyzes the user's emotion based on the motion of the user's body imaged by the imaging unit of the user terminal device 20 to calculate a second emotion analysis value for each user. Further, the user's emotion analysis unit 25 of the user terminal device 20 analyzes the user's reaction based on the type and volume of the user's utterance recorded by the sound recording unit of the user terminal device 20 to calculate a third emotion analysis value for each user. Further, the user's emotion analysis unit 25 of the user terminal device 20 analyzes the user's attribute based on the user information and the terminal information acquired through the user terminal device 20 to calculate a user attribute analysis value for each user.

Next, in each of the user terminal devices 20, the user's emotion analysis unit 25 of the user terminal device 20 calculates the first emotion analysis value, the second emotion analysis value, the third emotion analysis value, and the user attribute analysis value for each user, transmits the calculation result to the user's emotion integration unit 24 of the user terminal device 20.

Based on the calculation result, the user's emotion integration unit 24 of the user terminal device 20 uses an emotion analysis algorithm to calculate each of individual comprehensive emotion analysis values p1, p2, p3, ... each indicating the momentary laughter and emotion amount and the quality of emotion for each individual user. (S26).

The laughter/reaction generation unit 23 of the user terminal device 20 calculates the individual laughter/reaction generation values w1, w2, w3, ... based on the individual comprehensive emotion analysis values p1, p2, p3 ... for each user while referring the laughter/reaction derivation database unit (S27). The user terminal device 20 transmits the calculation result to the management terminal device 10 through the information communication unit 28 of the user terminal device 20 and the communication network 2. The management terminal device 10 receives the calculation result via the information communication unit 18 of the management terminal device 10.

The laughter/reaction generation unit 13 of the management terminal device 10 integrates the transmitted individual laughter/reaction generation values w1, w2, w3, ... as set data (data group) of all the users to generate a comprehensive laughter/reaction generation value W that is optimal for the venue environment of the show (S28).

When online delivery is performed, the online delivery unit 11 of the management terminal device 10 appropriately inserts image information and audio information into information to be delivered online based on the thus-generated comprehensive laughter/reaction generation value W by the image/audio insertion unit 12 to perform processing (S29).

<Advantages of Present Embodiment>

As described above, according to the online show rendition system 1 of the present embodiment, the user terminal device 20 analyzes the user's emotion based on the motion of the user's expression imaged by the imaging unit of the user terminal device 20 to calculate a first emotion analysis value, analyzes the user's motion based on the motion of the user's body imaged by the imaging unit of the user terminal device 20 to calculate a second emotion analysis value, analyzes the user's reaction based on the type and volume of the user's utterance recorded by the sound recording unit of the user terminal device 20 to calculate a third emotion analysis value, analyzes the user's attribute based on the user information and the terminal information acquired through the user terminal device 20 to calculate a user attribute analysis value, calculates a comprehensive user's emotion analysis value based on the first emotion analysis value, the second emotion analysis value, the third emotion analysis value and the user attribute analysis value for each user, generates image information and audio information based on a plurality of comprehensive user's emotion analysis values of at least some of all users, and causes the image output unit and the audio output unit of a user terminal device 20 to output online-delivered information with the image information and the audio information superimposed on the online-delivered information when the user terminal device 20 outputs the online-delivered information.

Other configurations and functions are similar to those of the first embodiment described above.

Although the description of specific embodiments has been completed above, aspects of the present invention are not limited to these embodiments, and modifications, improvements and the like can be made as appropriate.

For example, the user's emotion analysis unit (15, 25) is implemented as the function to be installed in the management terminal device (10) or the user terminal device (20), but the aspects of the present invention are not limited to this. The user's emotion analysis unit (15, 25) may be provided, for example, in another system or device, or may be implemented independently as a laughter analysis device.

Further, in the above-described second embodiment, the laughter/reaction generation unit (13, 23) is provided to both the management terminal device (10) and the user terminal device (20), but the aspects of the present invention are not limited to this. As in the above-described first embodiment, the laughter/reaction generation unit may be provided to only the management terminal device (10), or may be provided to only the user terminal device (20). In other words, the functions of the above-described online show rendition system (1) may be convoluted and role-shared between the management terminal device (10) and the user terminal device (20), or may be completely separated and role-shared therebetween, or may be provided so that all the functions are implemented only on one side.

INDUSTRIAL APPLICABILITY

In online delivery of shows such as on stages and in programs, the present invention is useful as an online show rendition system that tallies and numerically expresses realistic expressions, feelings, and reactions of viewers, and inserts appropriately measured and timed laughter and reactions into the online delivery based on the numerical values to enhance the emotions shared and a sense of reality felt by the audience. Further, in connection with this system, the present invention is useful as a laughter analysis device and a laughter analysis method that can quantitatively and accurately analyze laughter-related expressions or emotions of people (users such as viewers), and enhance the efficiency of an analysis work by simplifying the handling in the analysis.

EXPLANATION OF REFERENCE SIGNS

1: online show rendition system
2: communication network
10 management terminal device
11: online delivery unit 12: image/audio insertion unit
13: laughter/reaction generation unit
14: user's emotion integration unit
15: user's emotion analysis unit
16: analysis value determination unit
17: emotion analysis unit
18: information communication unit
19: analysis database unit
20: user terminal device
23: laughter/reaction generation unit
24: user's emotion integration unit
25: user's emotion analysis unit
28: information communication unit
A1: first facial surface position
A21, A22, A23: tsecond facial surface position
A31, A32, A33: third facial surface position
A41: fourth facial surface position, first lip position
A42: fourth facial surface position, second lip position
A43: fourth facial surface position, third lip position
C1: first feature quantity
C2: second feature quantity
C3: third feature quantity
C4: comprehensive feature quantity
D: intersection angle
V1: first vector
V2: second vector
W: comprehensive laughter/reaction generation value
m1, m2, m3: personal video data
p1, p2, p3: individual comprehensive emotion analysis value
w1, w2, w3: individual laughter/reaction generation value

The invention claimed is:

1. An online show rendition system comprising:
a management terminal device for delivering a show online; and
a plurality of user terminal devices, each comprising an image output unit, an audio output unit, an imaging unit, and a sound recording unit, being configured to be capable of mutually communicating information with the management terminal device, and outputting information delivered online by the management terminal device to the image output unit and the audio output unit to allow a user to view the show,
wherein at least one of the user terminal device and the management terminal device being configured to:
analyze an emotion of the user based on a motion of a facial expression of the user imaged by the imaging unit of the user terminal device to calculate a first emotion analysis value,
wherein, when the first emotion analysis value is calculated, at least a first facial surface position corresponding to a root portion, on an eye side of the user, of a zygomaticus major muscle of the user, and a plurality of second facial surface positions corresponding to portions other than the root portion of the zygomaticus major muscle on at least one of left and right sides of a face of the user have been acquired by the imaging unit of the user terminal device;
based on setting the first facial surface position as a first reference position and setting each of the second facial surface positions as a second reference position, calculate each of displacements between the second reference position and the first reference position in a predetermined time cycle;
sum up the calculated displacements for every predetermined time cycle to calculate a first feature quantity;
calculate a laughter-related emotion analysis value, of the first emotion analysis value, of the user based on the first feature quantity;
analyze a motion of the user based on a motion of a body of the user imaged by the imaging unit of the user terminal device to calculate a second emotion analysis value;
analyze a reaction of the user based on type and/or volume of an utterance of the user recorded by the sound recording unit of the user terminal device to calculate a third emotion analysis value;
analyze an attribute of the user based on user information and terminal information acquired through the user terminal device to calculate a user attribute analysis value;
calculate a comprehensive user's emotion analysis value based on the first emotion analysis value, the second emotion analysis value, the third emotion analysis value and the user attribute analysis value for each of the users;
generate image information and/or audio information based on a plurality of the comprehensive user's emotion analysis values in at least some of all the users; and
cause the image output unit and/or the audio output unit of the user terminal device to output online-delivered information with the image information and/or the audio information superimposed on the online-delivered information when the user terminal device outputs the online-delivered information.

2. The online show rendition system according to claim 1, further comprising a database in which at least one of location information, volume information, number-of-seats information, space information and expected number-of-spectators information of a real or virtual venue where the show is held is stored,
wherein at least one of the user terminal device and the management terminal device is further configured to generate the image information and/or the audio information also by referring to the database when generating the image information and/or the audio information.

3. A program stored on a non-transitory computer-readable medium for causing a computer to implement functions in order to allow a user to view a show, the computer being associated with a management terminal device for delivering the show online and/or a plurality of user terminal devices each comprising an image output unit, an audio output unit, an imaging unit and a sound recording unit, the management terminal device and the plurality of user terminal devices being configured to be capable of mutually communicating information, information online-delivered by the management terminal device being output to the image output unit and the audio output unit of each of the user terminal devices to allow the user to view the show, the functions comprising:
analyzing an emotion of the user based on a motion of a facial expression of the user imaged by the imaging unit of the user terminal device to calculate a first emotion analysis value,
wherein, when the first emotion analysis value is calculated, at least a first facial surface position corresponding to a root portion, on an eye side of the user, of a zygomaticus major muscle of the user, and a plurality of second facial surface positions corresponding to portions other than the root portion of the zygomaticus major muscle on at least one of left and right sides of a face of the user have been acquired by the imaging unit of the user terminal device;

based on setting the first facial surface position as a first reference position and setting each of the second facial surface positions as a second reference position, calculating each of displacements between the second reference positions and the first reference position in a predetermined time cycle;

summing up the calculated displacements for every predetermined time cycle to calculate a first feature quantity;

calculating a laughter-related emotion analysis value, of the first emotion analysis value, of the user based on the first feature quantity;

analyzing a motion of the user based on a motion of a body of the user imaged by the imaging unit of the user terminal device to calculate a second emotion analysis value;

analyzing a reaction of the user based on type and/or volume of an utterance of the user recorded by the sound recording unit of the user terminal device to calculate a third emotion analysis value;

analyzing an attribute of the user based on user information and terminal information acquired through the user terminal device to calculate a user attribute analysis value;

calculating a comprehensive user's emotion analysis value based on the first emotion analysis value, the second emotion analysis value, the third emotion analysis value and the user attribute analysis value for each of the users;

generating image information and/or audio information based on a plurality of the comprehensive user's emotion analysis values in at least some of all the users; and causing the image output unit and/or the audio output unit of the user terminal device to output online-delivered information with the image information and/or the audio information superimposed on the online-delivered information when the user terminal device outputs the online-delivered information.

4. The program according to claim 3, further causing the computer to implement a function of generating the image information and/or the audio information also by referring to a database in which at least one of location information, volume information, number-of-seats information, space information and expected number-of-spectators information of a real or virtual venue where the show is held is stored, when generating the image information and/or the audio information.

5. A laughter analysis device configured to:
acquire, by an imaging unit, at least a first facial surface position corresponding to a root portion, on an eye side of a subject, of a zygomaticus major muscle of the subject, and a plurality of second facial surface positions corresponding to portions other than the root portion of the zygomaticus major muscle on at least one of left and right sides of a face of the subject;

based on setting the first facial surface position as a first reference position and setting each of the second facial surface positions as a second reference position, calculate each of displacements between the second reference position and the first reference position in a predetermined time cycle, and sum up the calculated displacements for every predetermined time cycle to calculate a first feature quantity; and calculate a laughter-related emotion analysis value of the subject based on the first feature quantity.

6. The laughter analysis device according to claim 5, configured to:

further acquire a plurality of third facial surface positions corresponding to cheekbone fat of the subject on at least one of the left and right sides of the face of the subject;

after setting each of the plurality of third facial surface positions as a third reference position, calculate a third feature quantity based on a degree of aggregation at a position group configured of the third reference position in a predetermined time cycle; and calculate the emotion analysis value based on the first feature quantity and the third feature quantity.

7. The laughter analysis device according to claim 6, wherein the degree of aggregation is calculated by setting a plurality of pairs at the position group, calculating respective displacements between the pairs, and summing up the thus-calculated respective displacements for every predetermined time cycle.

8. The laughter analysis device according to claim 6, configured to:

in a predetermined time cycle, sum up at least the first feature quantity and the second feature quantity after the first feature quantity and the second feature quantity are respectively multiplied by predetermined weighting factors which are individually set for the first feature quantity and the second quantity respectively, thereby calculating a comprehensive feature quantity;

calculate unit laughter energy indicating an energy amount related to laughter per unit time cycle in a predetermined time cycle according to a predetermined dynamic model based on a difference between the comprehensive feature quantity in the predetermined time cycle and the comprehensive feature quantity in a time cycle being one before the predetermined time cycle;

accumulatively add the unit laughter energy for every predetermined time cycle to calculate a total laughter energy up to the predetermined time cycle; and calculate the emotion analysis value based on the total laughter energy.

9. The laughter analysis device according to claim 8, configured to:

determine relation in magnitude between the comprehensive feature quantity calculated for every predetermined time cycle and a first threshold value for every predetermined time cycle, and count a number of consecutive times at which the same determination indicating "larger" or "smaller" has continued until the predetermined time cycle since a previous predetermined time cycle; and attenuate and calculate the unit laughter energy in accordance with the number of consecutive times.

10. The laughter analysis device according to claim 8, configured to:

determine, for every predetermined time cycle, whether the unit laughter energy calculated for every predetermined time cycle is larger than a second threshold value;

when it is determined that the unit laughter energy is larger than the second threshold value, add the unit laughter energy in the predetermined time cycle to the total laughter energy calculated in a time cycle being one before the predetermined time cycle to calculate the total laughter energy in the predetermined time cycle; and when it is determined that the unit laugh energy is not larger than the second threshold value, attenuate the total laughter energy calculated in a time cycle being one before the predetermined time cycle, to calculate the total laughter energy to be set as the total laughter energy up to the predetermined time cycle.

11. A laughter analysis method comprising:
acquiring, by an imaging unit, at least a first facial surface position corresponding to a root portion, on an eye side of a subject, of a zygomaticus major muscle of the subject, and a plurality of second facial surface positions corresponding to portions other than the root portion of the zygomaticus major muscle on a facial surface of the subject;
based on setting the first facial surface position as a first reference position and setting each of the second facial surface positions as a second reference position, calculating each of displacements between the second reference position and the first reference position in a predetermined time cycle, and summing up the calculated displacements for every predetermined time cycle to calculate a first feature quantity; and
calculating a laughter-related emotion analysis value of the subject based on the first feature quantity.

12. The laughter analysis method according to claim 11, comprising:
further acquiring a plurality of third facial surface positions corresponding to cheekbone fat of the subject on at least one of the left and right sides of the face of the subject, after setting each of the plurality of third facial surface positions as a third reference position, calculate a third feature quantity based on a degree of aggregation at a position group configured of the third reference position in a predetermined time cycle; and
calculating the emotion analysis value based on the first feature quantity and the second feature quantity.

13. The laughter analysis method according to claim 12, wherein the degree of aggregation is calculated by setting a plurality of pairs at the position group, calculating displacements between the respective pairs, and summing up the thus-calculated respective displacements for every predetermined time cycle.

14. The laughter analysis method according to claim 12, comprising:
in a predetermined time cycle, summing up at least the first feature quantity and the second feature quantity after the first feature quantity and the second feature quantity are respectively multiplied by predetermined weighting factors which are individually set for the first feature quantity and the second quantity respectively, thereby calculating a comprehensive feature quantity;
calculating unit laughter energy indicating an energy amount related to laughter per unit time cycle in a predetermined time cycle according to a predetermined dynamic model based on a difference between the comprehensive feature quantity in the predetermined time cycle and the comprehensive feature quantity in a time cycle being one before one the predetermined time cycle;
accumulatively adding the unit laughter energy for every predetermined time cycle to calculate a total laughter energy up to the predetermined time cycle; and
calculate the emotion analysis value based on the total laughter energy.

15. The laughter analysis method according to claim 14, comprising:
determining relation in magnitude between the comprehensive feature quantity calculated for every predetermined time cycle and a first threshold value for every predetermined time cycle, and count a number of consecutive times at which the same determination indicating "larger" or "smaller" has continued until the predetermined time cycle since a previous predetermined time cycle; and
attenuating and calculating the unit laughter energy in accordance with the number of consecutive times.

16. The laughter analysis method according to claim 14, comprising:
determining, for every predetermined time cycle, whether the unit laughter energy calculated for every predetermined time cycle is larger than a second threshold value;
when it is determined that the unit laughter energy is larger than the second threshold value, adding the unit laughter energy in the predetermined time cycle to the total laughter energy calculated in a time cycle being one before the predetermined time cycle to calculate the total laughter energy in the predetermined time cycle; and
when it is determined that the unit laugh energy is not larger than the second threshold value, attenuating the total laughter energy calculated in a time cycle being one before the predetermined time cycle, to calculate the total laughter to be set as the total laughter energy up to the predetermined time cycle.

17. A non transitory computer-readable medium storing a program causing a computer to implement functions comprising:
acquiring, at least a first facial surface position corresponding to a root portion, on an eye side of the user, of a zygomaticus major muscle of the subject, and a plurality of second facial surface positions corresponding to portions other than the root portion of the zygomaticus major muscle on a facial surface of the subject acquired by an imaging unit; based on setting the first facial surface positions as first reference positions and setting each of the second facial surface positions as second reference positions, calculating each of displacements between the second reference positions and the first reference positions in a predetermined time cycle, and summing up the calculated displacements for every predetermined time cycle to calculate a first feature quantity; and calculating a laughter-related emotion analysis value of the subject based on the first feature quantity.

18. The non transitory computer-readable medium according to claim 17, causing the computer to implement functions comprising:
further acquiring a plurality of third facial surface positions corresponding to cheekbone fat of the subject on at least one of left and right sides of a face of the subject, after setting each of the plurality of third facial surface positions as a third reference position, calculating a third feature quantity based on a degree of aggregation at a position group configured of the third reference positions in a predetermined time cycle; and
calculating the emotion analysis value based on the first feature quantity and the third feature quantity.

19. The non transitory computer-readable medium according to claim 18, causing the computer to implement functions comprising:
calculating the degree of aggregation by setting a plurality of pairs at the position group, calculating displacements between the respective pairs, and summing up the thus-calculated respective displacements for every predetermined time cycle.

20. The non transitory computer-readable medium according to claim 18, causing the computer to implement functions comprising:
- in a predetermined time cycle, summing up at least the first feature quantity and the second feature quantity after the first feature quantity and the second feature quantity are respectively multiplied by predetermined weighting factors which are individually set for the first feature quantity and the second quantity respectively, thereby calculating a comprehensive feature quantity;
- calculating unit laughter energy indicating an energy amount related to laughter per unit time cycle in a predetermined time cycle according to a predetermined dynamic model based on a difference between the comprehensive feature quantity in the predetermined time cycle and the comprehensive feature quantity in a time cycle being one before one cycle with reference to the predetermined time cycle;
- accumulatively add the unit laughter energy for every predetermined time cycle to calculate a total laughter energy up to the predetermined time cycle; and
- calculate the emotion analysis value based on the total laughter energy.

21. The non transitory computer-readable medium according to claim 20, causing the computer to implement functions comprising:
- determining relation in magnitude between the comprehensive feature quantity calculated for every predetermined time cycle and a first threshold value for every predetermined time cycle, and count a number of consecutive times at which the same determination indicating "larger" or "smaller" has continued until the predetermined time cycle since a previous predetermined time cycle; and
- attenuating and calculating the unit laughter energy in accordance with the number of consecutive times.

22. The non transitory computer-readable medium according to claim 20, causing the computer to implement functions comprising:
- determining, for every predetermined time cycle, whether the unit laughter energy calculated for every predetermined time cycle is larger than a second threshold value;
- when it is determined that the unit laughter energy is larger than the second threshold value, adding the unit laughter energy in the predetermined time cycle to the total laughter energy calculated in the time cycle being one before the predetermined time cycle to calculate the total laughter energy in the predetermined time cycle; and
- when it is determined that the unit laugh energy is not larger than the second threshold value, attenuating the total laughter energy calculated in a time cycle being one before the predetermined time cycle, to calculate the total laughter to be set as the total laughter energy up to the predetermined time cycle.

* * * * *